United States Patent [19]
Kobayashi et al.

[11] Patent Number: 5,686,017
[45] Date of Patent: Nov. 11, 1997

[54] POLYMER DISPERSED LIQUID CRYSTAL (PDLC) DISPLAY ELEMENT FOR USE IN AN ELECTRONIC APPARATUS

[75] Inventors: Hidekazu Kobayashi; Eiji Chino; Masayuki Yazaki; Hidehito Iisaka, all of Suwa, Japan

[73] Assignee: Seiko Epson Corporation, Tokyo, Japan

[21] Appl. No.: 346,598

[22] Filed: Nov. 29, 1994

[30] Foreign Application Priority Data

| Mar. 29, 1993 | [JP] | Japan | 5-70379 |
| Dec. 2, 1993 | [JP] | Japan | 5-302993 |
| Jan. 24, 1994 | [JP] | Japan | 6-5927 |
| Mar. 15, 1994 | [JP] | Japan | 6-44144 |

[51] Int. Cl.$^6$ .................... C09K 19/52; G02F 1/13
[52] U.S. Cl. .................... 252/299.01; 428/1; 349/183; 349/186; 349/86; 349/89
[58] Field of Search .................... 252/299.01; 349/182, 349/183, 86, 88, 89

[56] References Cited

U.S. PATENT DOCUMENTS

| 4,994,204 | 2/1991 | Doane et al. | 212/249.01 |
| 5,021,188 | 6/1991 | Vaz et al. | 252/299.5 |
| 5,270,843 | 12/1993 | Wang | 359/52 |
| 5,305,126 | 4/1994 | Kobayashi et al. | 359/52 |
| 5,401,437 | 3/1995 | Im | 252/299.01 |
| 5,437,811 | 8/1995 | Doane et al. | 252/299.01 |

FOREIGN PATENT DOCUMENTS

| 0 238 164 | 9/1987 | European Pat. Off. . |
| 0 272 585 | 6/1988 | European Pat. Off. . |
| 0 563 403 A1 | 10/1993 | European Pat. Off. . |
| 40 07 039 | 10/1990 | Germany . |
| 147681 | 8/1985 | Japan . |
| 55318 | 2/1990 | Japan . |
| 138722 | 11/1990 | Japan . |
| 2782230 | 11/1990 | Japan . |
| 58021 | 3/1991 | Japan . |
| WO 89/09807 | 10/1989 | WIPO . |
| 91/01511 | 7/1991 | WIPO . |
| WO 92/19695 | 11/1992 | WIPO . |

OTHER PUBLICATIONS

J. L. West et al., "Cholesteric/Polymer Dispersed Light Shutters", *Applied Physic Letters*, vol. 63, No. 11, Sep. 1993, New York, U.S., pp. 1471–1473.
Patent Abstracts of Japan, vol. 16, No. 407 (P–1411), JP–A–4–136814, May 11, 1992.
Patent Abstracts of Japan, vol. 12, No. 354 (P–761), JP–A–6–3106725, May 11, 1988.
Patent Abstracts of Japan, vol. 18, No. 78 (P–1689), JP–A–5–289064, May 11, 1993.
R. A. M. Hikmet, "Electrically Induced Light Scattering from Anisotropic Gels with Negative Dielectric Anisotropy", *Mol. Cryst. Liq. Cryst.*, 1992, vol. 213, pp. 117–131.

*Primary Examiner*—Shean C. Wu
*Attorney, Agent, or Firm*—Oliff & Berridge

[57] ABSTRACT

A polymer dispersed liquid crystal (PDLC) display element for use in an electronic apparatus wherein the display element operates in a PDLC mode or reverse PDLC mode providing for reduction of visual display haze, improved display contrast. The particular medium includes a liquid crystal portion and a polymer portion and may include a chiral component. In cases where visual display haze and contract is a particular problem in the utility of the reverse PDLC display element, such as in the case where the display element is combined with a solar battery, a sufficient amount of dichroic dye is added to the liquid crystal portion of the medium, and, further, a compound showing no fluorescence emission with respect to a liquid crystal portion, or a polymer or a chiral polymer precursor portion of the medium, is employed. The resulting electronic apparatus can, therefore, incorporate a reverse PDLC type display element in combination with a solar battery or other component that affects display quality in such elements to improve the overall visual quality and contrast in the display rendering the display more useful in more miniaturized applications.

20 Claims, 6 Drawing Sheets

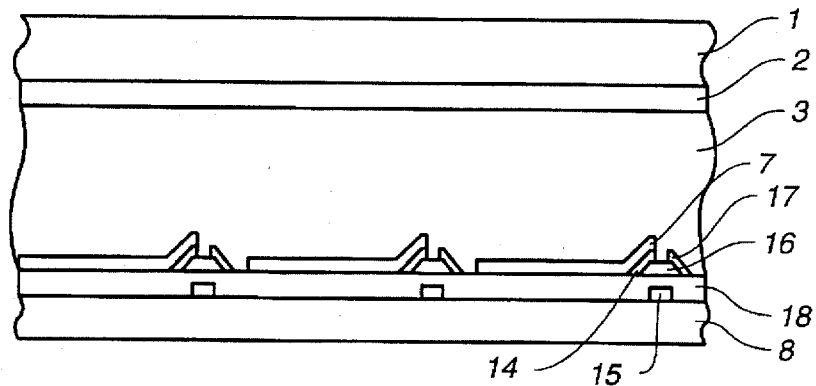
FIG._1
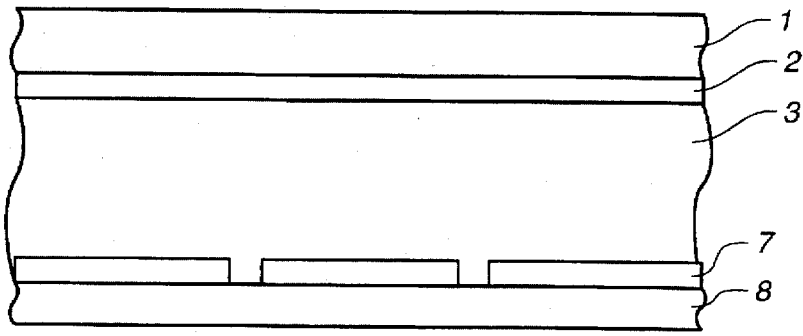
FIG._2
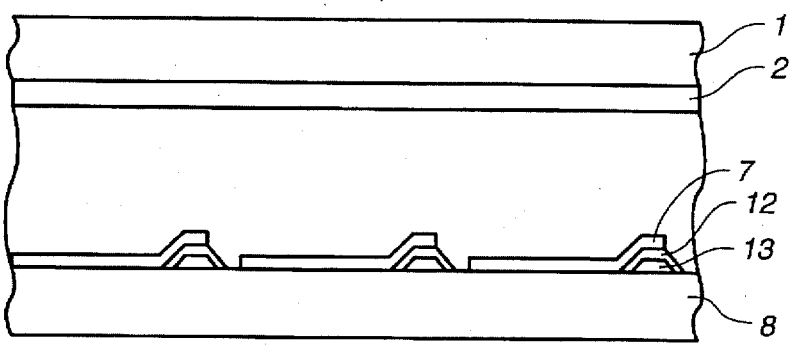
FIG._6
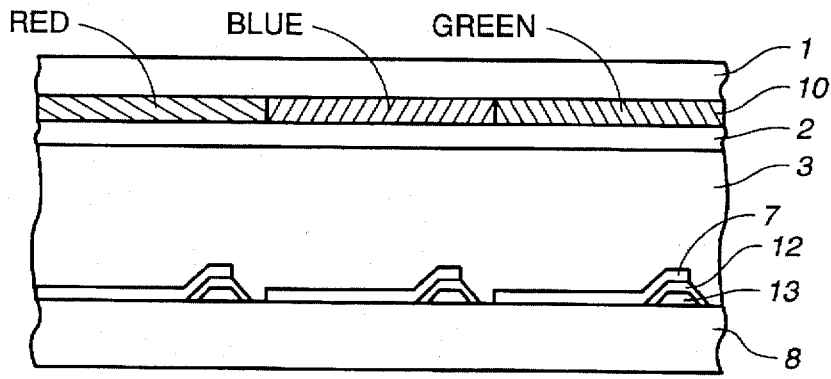
FIG._7

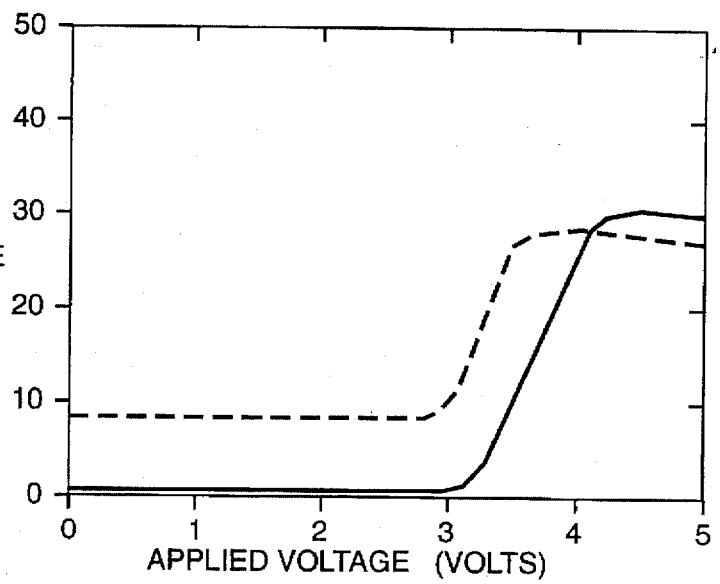
FIG._3
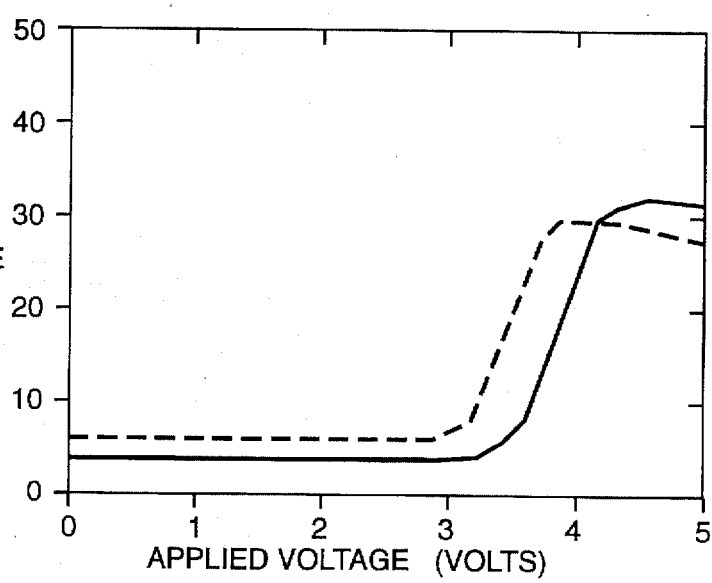
FIG._4
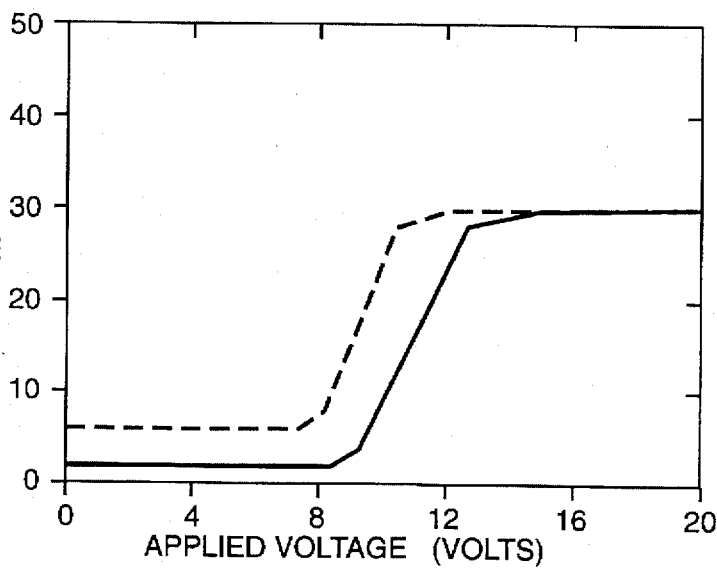
FIG._5

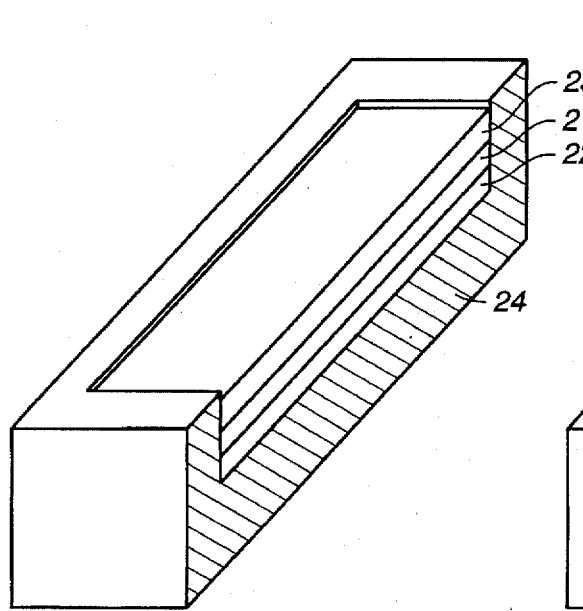
FIG._8
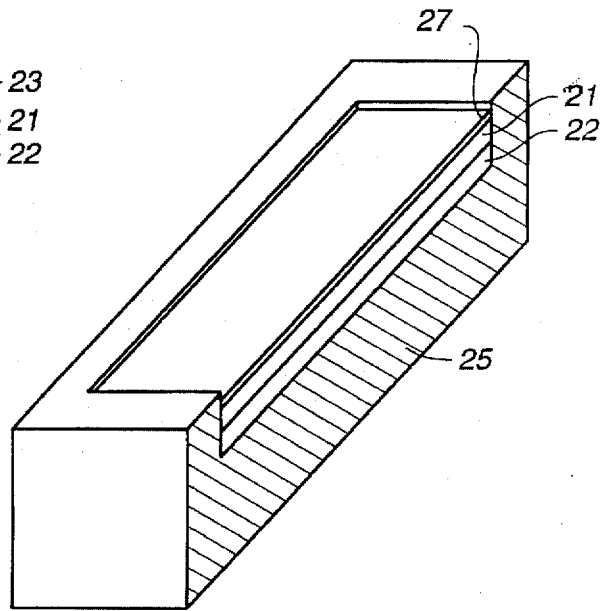
FIG._11
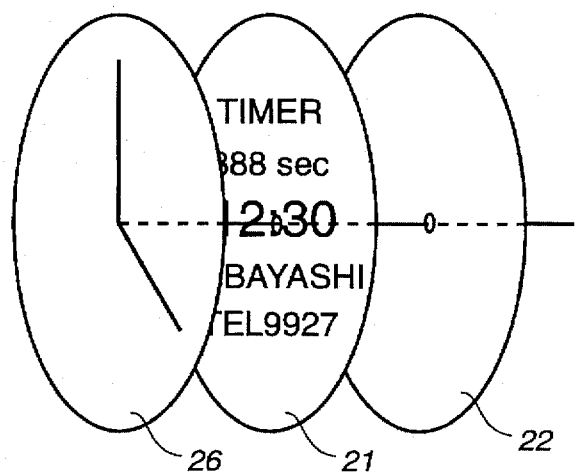
FIG._9
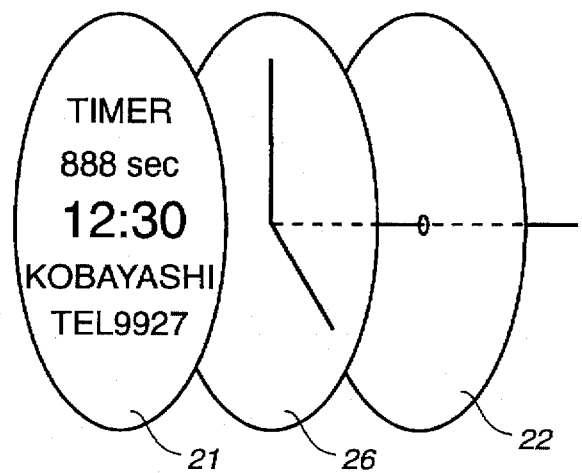
FIG._10

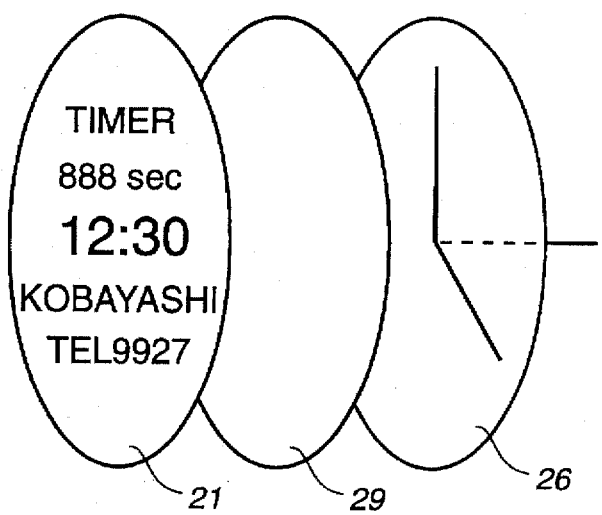
FIG._12
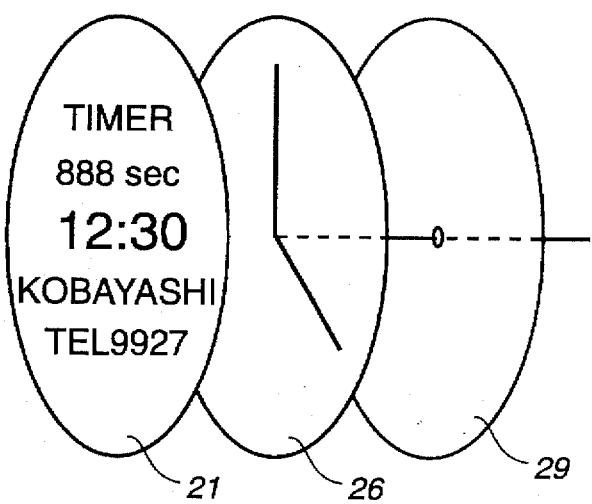
FIG._13
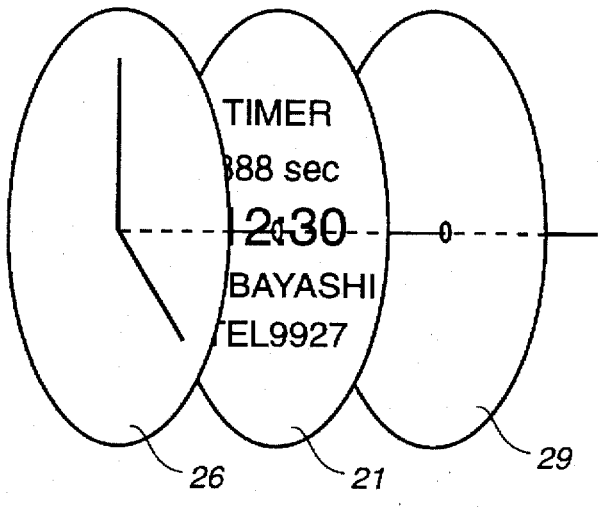
FIG._14

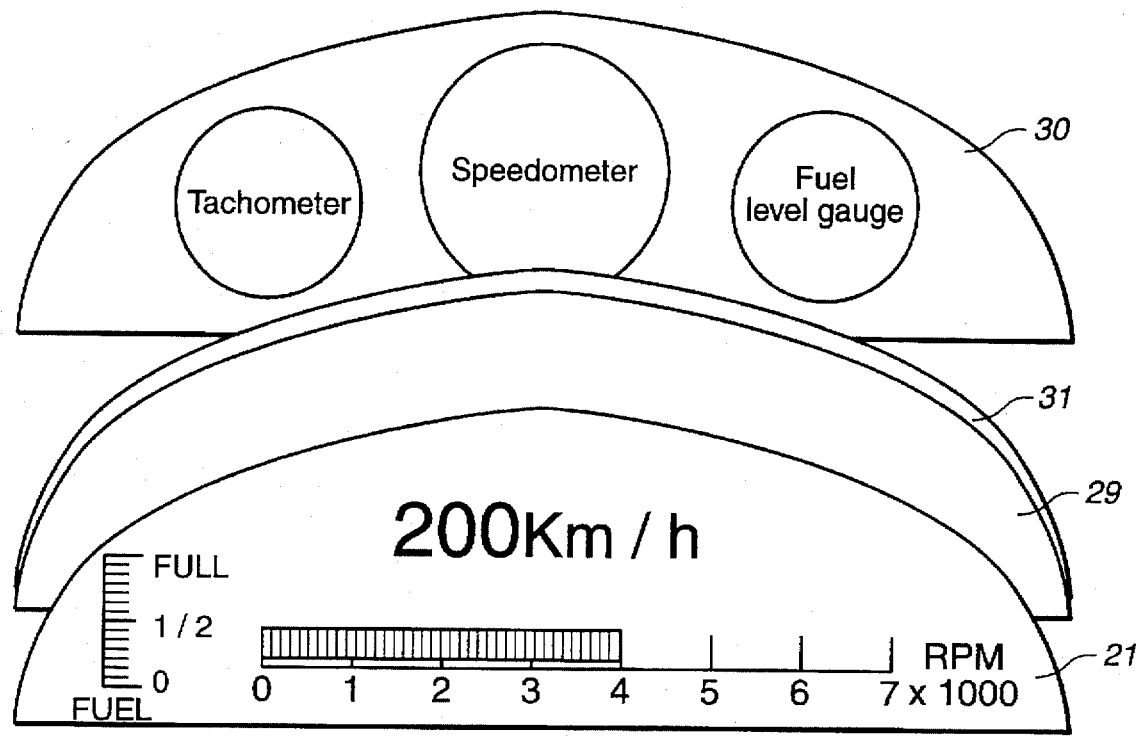
FIG._15
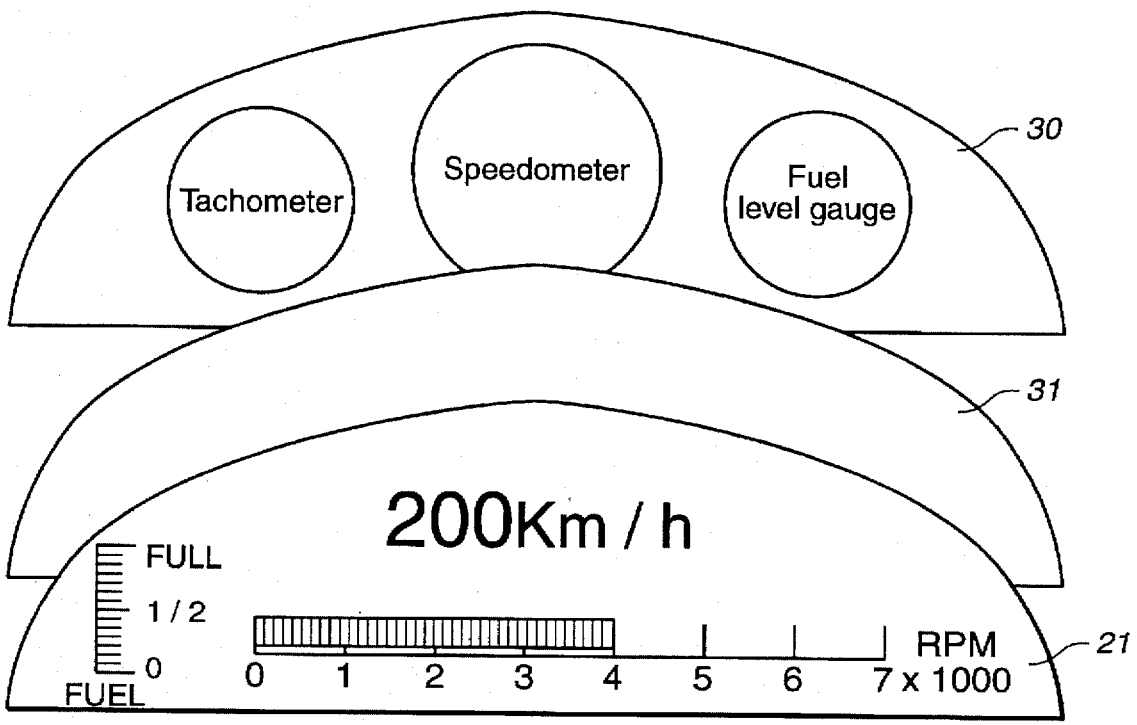
FIG._16

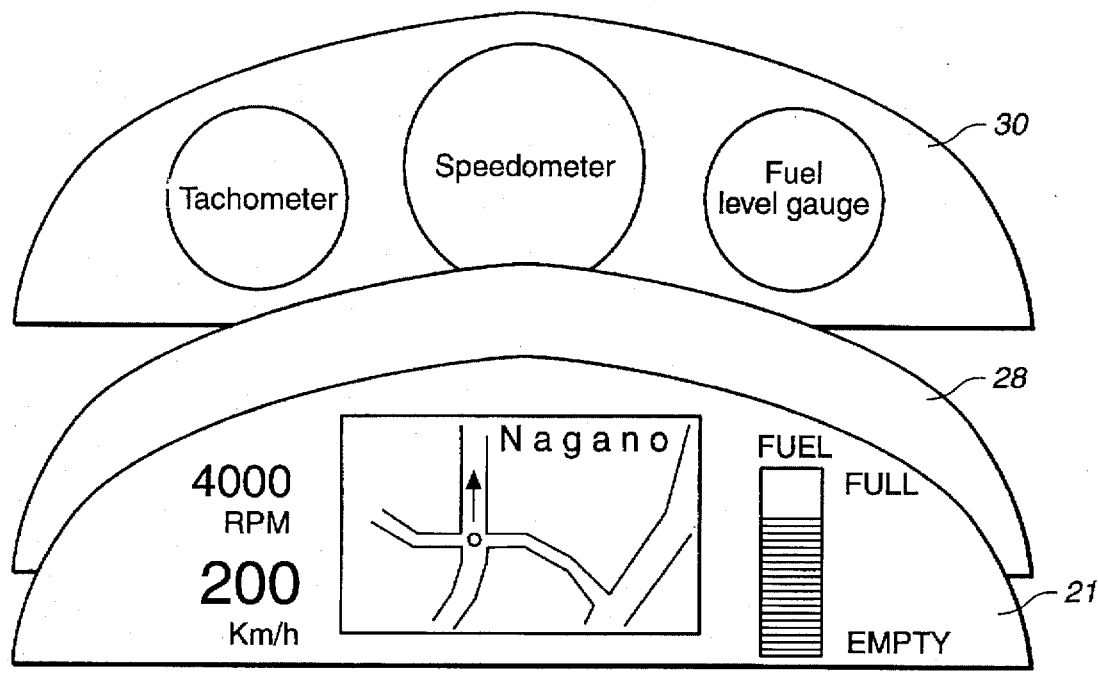
FIG._17
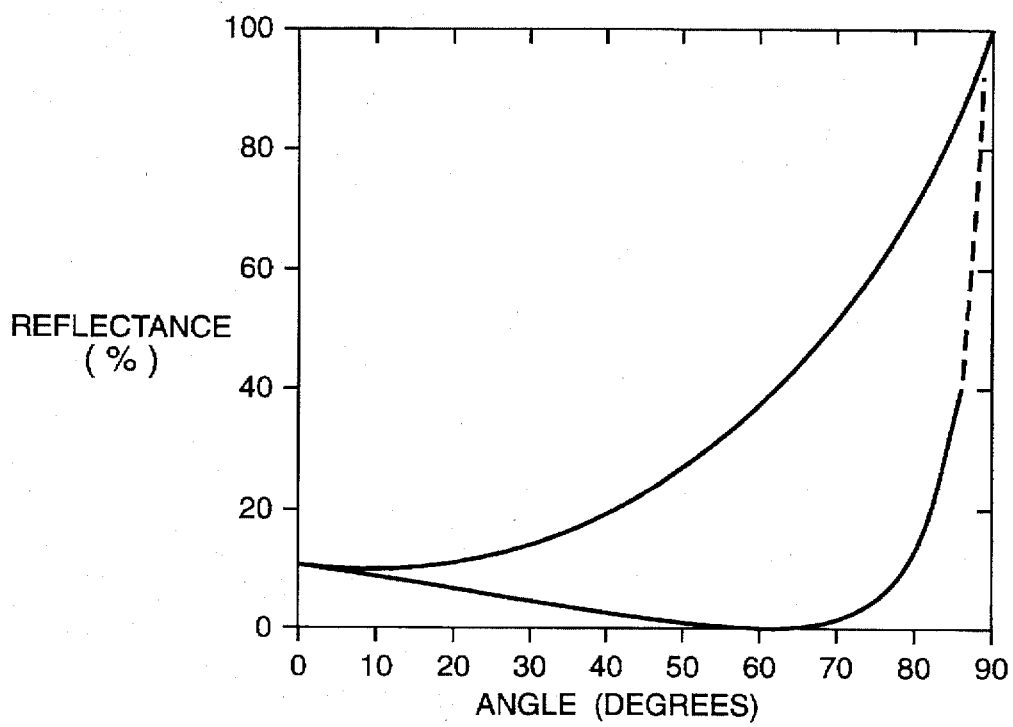
FIG._18

POLYMER DISPERSED LIQUID CRYSTAL (PDLC) DISPLAY ELEMENT FOR USE IN AN ELECTRONIC APPARATUS

RELATED APPLICATION

This application is a continuation of International Application No. PCT/JP94/00505, filed Mar. 29, 1994.

BACKGROUND OF THE INVENTION

1. Technical Field

This invention relates to reflective type, bright display elements useful as a display in wrist watches, meter display panels of vehicles, information display terminals for electronic memorandum books or computer notebooks, computers and televisions, or information bulletin boards, and to the construction and configuration of electronic apparatus employing such display elements as provided in a visual display, such as a LCD panel.

2. Background

Various kinds and styles of wrist watches or time pieces, such as analog-type of watches with hand pointers and digital-type of watches equipped with liquid crystal display elements, have been developed and offered as time-keeping products. Recently, in addition to these standard types of watches, hybrid-type of watches have also been developed which are equipped with a smaller LC (Liquid crystal) window for display because of other types of information to be displayed. Also, there has been developed the two-layer type watches with a liquid crystal display element superposed on the surface of analog-type watch having hand pointers for indicating time. As examples, see Japanese Laid-Open Patent Application Nos. 94940/1979, 136718/1979, 26986/1980, 46845/1980, 188786/1980, 23024/1981 and 65618/1981. In the field of watches and electronic memorandum books, there have recently been developed various kinds of multi-functional type of watches capable of carrying out different kinds of informational functions. For these multi-functional uses in connection with watches, it is expected that the development of novel type of display elements may become the new practice and trend in future watch design.

On the other hand, displays employed in electronic apparatus for specialized display use, such as a meter panel for an automobile, are needed to display various kinds of information within a limited space. Furthermore, particularly in automotive meter panels, the display mode to be employed should be selected to be either analog type or digital type.

In addition, in the field of information devices including watches, the current trend has been toward a more compact and portable type of structure with concurrent demand for reducing electric energy consumption of the display element to be mounted in these devices. In such portable information display devices or information processing apparatus, batteries have been conventionally employed. Therefore, the lifetime of batteries to be used is an important factor in their use. From this viewpoint of energy saving, devices incorporating a solar battery have recently been developed. In an apparatus disclosed in Japanese Patent Publication No. 61930/1991, for example, a liquid crystal display element and a solar battery are incorporated together in order to provide saving of space in the apparatus. In Japanese Laid-Open Patent Application No. 106725/1988, for example, there is disclosed an apparatus having a structure wherein a solar battery is designed to surround a LC display element.

Practical embodiments of such an apparatus employ liquid crystal material dispersed in polymer, which is then encapsulated in the liquid crystal display element. These encapsulated mediums are referred to as Polymer Dispersed Liquid Crystal ("PDLC") mediums. These types of mediums provide for a bright, reflective-type display element requiring no polarizing plates suitable for the use in these types of liquid crystal display elements. PDLC display elements are of two modes. One mode is the type of medium that becomes transparent to transmissive light in the presence of an applied electric field and scatters light in the absence of an applied electric field, as illustrated in Japanese Patent Publication No. 501631/1983. Another mode, which is referred to as "reverse PDLC", is the type that scatters light in the presence of an applied electric field and absorbs light or becomes transparent to light in the absence of a field, as illustrated in Japanese Laid-Open Patent Application No. 227684/1992 relating to a gel network type of reverse PDLC, Japanese Laid-Open Patent Application No. 119302/1993 relating to particle-orientation/dispersion type of reverse PDLC, and U.S. Pat. No. 4,994,204 relating to a liquid crystal droplet-dispersion type of reverse PDLC. For the purpose of increasing birefringence of liquid crystals and polymers of these PDLC modes as well as improving their degree of light scattering, liquid crystals or polymers having a terphenyl skeleton or a terphenyl skeleton containing a hetero atom are employed.

Conventional hybrid-type watches may be provided with separate analog display and digital display portions and, therefore, individual display areas are reduced in size to accommodate spacing rendering it more difficult to see the displayed information. In addition, since the digital display portion is of the twisted nematic type employing a polarizing plate, the displayed image appears darker, further decreasing its visibility. Furthermore, the incorporation of a solar battery in such a hybrid-type watch, while desirable, is more difficult due to limitations on available space. A solar battery has been previously incorporated with a liquid crystal display element in such hybrid-type watches in the past. However, the liquid crystal display element incorporated with such a solar battery provides for low transmittance levels. For example, a twisted nematic type liquid crystal using a polarizing plate had a transmittance of 30% or less and a guest-host type liquid crystal had a transmittance of 60% or less, resulting in a comparatively lower production efficiency of electric power of the solar battery. Also, since the display mode employs a dark reflector as a background, such as the solar battery itself, the visibility of the watch display becomes even more reduced. In addition, in case where a liquid crystal display element utilizing dynamic scattering effect is superposed on a solar battery, the display principle accompanies ionic flow, and, therefore, requires an increase in electric power consumption of the battery. From these reasons, the integration of a liquid crystal display element with a solar battery has not been, in practice, successful.

In the case where the display portion of electronic apparatus has a special utility, such as an on-vehicle-type meter display panel, both an analog and digital display are sometimes incorporated into a single, limited display space. In this situation, it is necessary to provide a larger display space.

Recently, car navigation systems, on-vehicle television receivers and video projectors have come into use. In general, the displays of these electronic apparatus are placed near the central region of the vehicle console section. As a result, the vehicle driver must turn his head to align his/her eyes toward the passenger's seat in order to observe the display, which may be dangerous since the eyes are not momentarily observing the roadway.

Also, conventional on-vehicle-type meter display panels and the like employ a self-emissive light system or a backlight system to render the displayed information more visible. This results in the disadvantage that the display of the panel can not be seen well in the daytime, particularly when the outside ambient light is very bright. In addition, users may desire to select either an analog or digital type of display according to their individual taste or desires.

Conventional PDLC or reverse PDLC compounds used in PDLC display elements have a fluorescence emission in the visible region, such as compounds having a terphenyl skeleton, for purposes of improving birefringence or for mismatching of the refractive indices between the employed liquid crystal material and the polymer. As a result, noticeable fluorescence and haze in the transparent state is produced. Therefore, a good transparent state in the display system can not be created so that the display contrast is reduced. For example, in a PDLC display element or panel, the transparency in the presence of an applied voltage becomes low. When a light absorbing layer is placed at the back surface of the element, the color of the background appears turbid due to the fluorescence and haze caused by this particular kind of liquid crystal layer.

Moreover, in the case of a reverse PDLC display element or panel, because of the fluorescence and haze of this kind of liquid crystal layer, the degradation of the transparent state in the absence of an applied voltage results so that when a light absorbing layer is placed at the back surface of the element, the color of the background also appears turbid due to the fluorescence and haze created by the liquid crystal layer. Also, a reverse PDLC display element containing a dichroic dye mixed with the liquid crystal and including a light reflective layer positioned at the back surface provides the problem that the color state with the dichroic dye appears turbid in the absence of applied electric field due to fluorescence and haze created by the liquid crystal layer, resulting in degradation of the display contrast.

In the employment of conventional techniques for the purpose of improving scattering degree in the scattering mode of the display, a low molecular weight, chiral component is placed in the liquid crystal medium. During the preparation process, a polymer precursor incorporated with the liquid crystal compound is polymerized to increase the proportional content of the low molecular weight, chiral component in the liquid crystal. The increase in the proportional content of the low molecular weight, chiral component reduces the chiral pitch in the liquid crystal. As the result, a mismatch between the twist structure of the polymer at the initial stage of polymerization as compared to after the polymerization is produced, resulting in creation of haze in the display element in a transparent state in the absence of an applied electric field. Furthermore, such a change in the chiral pitch caused by a low molecular weight, chiral component is temperature dependent, which causes changes, particularly increases, in the amount of display haze.

The creation of haze, therefore, is a serious problem in a transparent-scattering, switching mode PDLC medium containing no dichroic dye. For example, in the case used as a cover glass and a clockface of a watch, a haze generated in a transparent state of a display element makes the production value remarkably deteriorate. In case of a display element containing dichroic dye with a reflective layer on its back surface, the display element employs the modes of switching between light absorption and light scattering. However, even in this case, the creation of the fluorescence and haze effect also remarkably deteriorates contrast in the light absorbing state of the display.

Accordingly, it is an object of this invention to provide a novel PDLC or reverse PDLC display element having brighter display quality, particularly in its light scattering state, compared to previously known PDLC and reverse PDLC display elements, as well as providing less fluorescence and haze effect in its transparent state while improving overall display contrast. Moreover, the liquid crystal/polymer medium is provided to have high reliability, enhancing the reliability of the display element so that different active elements or a color filter may be effectively employed to provide a display element having multiple utility in various different types of electronic apparatus.

Another object of this invention is the provision of an electronic apparatus having lower power consumption with improved display quality and life by combining a reverse PDLC display element which is highly light transmissive so as to be employed with any one of a plurality of different types of electronic apparatus having its own display apparatus and/or with an underlying solar battery.

A further object of this invention is provision of a technique for improving the visibility of a display in an electronic apparatus, particularly in bright ambient light.

SUMMARY OF THE INVENTION

According to this invention, a display element for employment with an electronic apparatus is fabricated by mixing together a polymer or polymer precursor and a liquid crystal material, placing the resulting mixed solution in its liquid crystalline state between a pair of spaced electrodes to produce a PDLC or a reverse PDLC display element, and bring about a phase separation of the polymer from the liquid crystal, wherein dichroic dye is added to the liquid crystal to provide for transmitted light absorption is in the range of about 1% to 20% in the absence of an applied electric field. The display element of this invention is further includes the use of a chiral component that provides for a chiral pitch in the liquid crystal before phase separation that is approximately identical to a chiral pitch in the liquid crystal after phase separation. Moreover, a low molecular weight, chiral component and chiral polymer precursor are employed as the chiral components to provide for chiral pitch. These chiral components are mixed with the polymer precursor and liquid crystal material, and the polymer precursor is polymerized in the liquid phase by means for polymerization so that the chiral polymer precursor is incorporated into the resulting polymerized polymer portion and the low molecular weight, chiral component is incorporated into the liquid crystal portion.

The chiral component employed in this invention is less temperature sensitive in the temperature range of operation of the display so that ambient temperature changes cause only a 20% or less change in the chiral pitch. Further, at least two kinds of chiral components having opposite temperature dependency effects on the chiral pitch relative to each other are employed as the chiral component in the liquid crystal/polymer medium in order to reduce the amount of chiral pitch.

In the display element of this invention, compounds exhibiting a fluorescence quantum yield of 0.3 or less are employed as the liquid crystal and polymer materials in the total amount of not less than 60% by weight. Examples of compounds exhibiting 0.3 or higher of a fluorescence quantum yield contain a terphenyl, anthracene or perylene skeleton or the like. If such compounds are employed as liquid crystal and polymer materials, very large emissions of fluorescence would be created resulting in a significant deterioration in display contrast. On the other hand, in the present invention, compounds exhibiting a 0.3 or less of fluorescence quantum yield are employed having a biphenyl or tolane skeleton, being the principal liquid crystal and polymer materials, or those having a terphenyl skeleton are contained in an amount of 10% or less in the liquid crystal and polymer materials.

Relative to other attributes of the present invention, the display element PDLC material may be a polymer that is particulate in form, or may take on the form of coupled or chain connected particles, or particle aggregates, or a gel-network form. The liquid crystal may be dispersed throughout the polymer in droplet form. As previously indicated, the display element the PDLC medium includes a chiral component in the liquid crystal. Also, the liquid crystal may also include a dichroic dye. Furthermore, the display element may also include a light absorbing plate, such as a solar battery, at its rear or back surface. The display element may include a group of electrodes formed on a surface of a pair of substrates which are supported in spatial relation with the liquid crystal/polymer medium therebetween, wherein one of the substrates is made of reflective material.

The electronic apparatus including the display element of this invention may utilize a liquid crystal medium, e.g., a PDLC medium or a reverse PDLC medium, that is transparent in the absence of applied electric field with a solar battery placed in superposed relation with the display element to form part of the information display image, or the display element may be the surface cover itself for any type of other display apparatus. The display element is fabricated by placing a mixed liquid solution of a polymer or polymer precursor and liquid crystal material between a pair of spaced electrodes, and then causing a phase separation of the polymer from the liquid crystal utilizing means to bring about phase separation. Furthermore, the electronic apparatus is may be provided with a layer, preferably made of a transparent or highly refractive material, is placed on the back surface of the display element or between a back surface (e.g., a solar battery) and the PDLC display element.

The display element and the electronic apparatus utilizing the display element of this invention may have the display viewing surface on the observer or front side of the display element subjected to a non-glare treatment and/or an anti-reflection treatment. Also, at least one of the substrates employed in the display element may have a color filter formed on its surface in facing relation with the liquid crystal/polymer medium. Further, at least one of the substrates employed in the display element is provided with active elements formed on its surface in contact with the liquid crystal/polymer medium.

Furthermore, the display element and the electronic apparatus utilizing the display element of this invention may utilize a liquid crystal containing one or more of the following compounds:

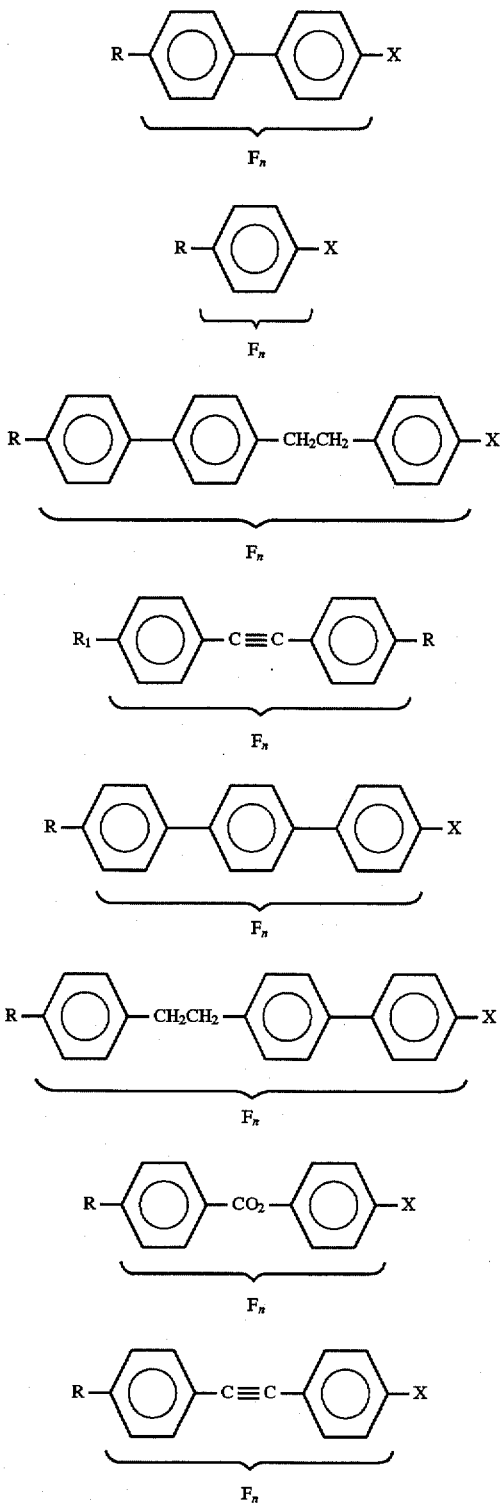

wherein n is an integer; R represents an alkyl, alkoxy, cycloalkyl or cycloalkoxy group; $R_1$ and $R_2$ independently represent an alkyl, cycloalkyl, alkoxy or cycloalkoxy group or H or F; and X represents H, F, Cl or CN.

The display element and the electronic apparatus are also characterized in that the polymer is prepared for polymerization employing at least one polymer precursor selected from the following compounds:

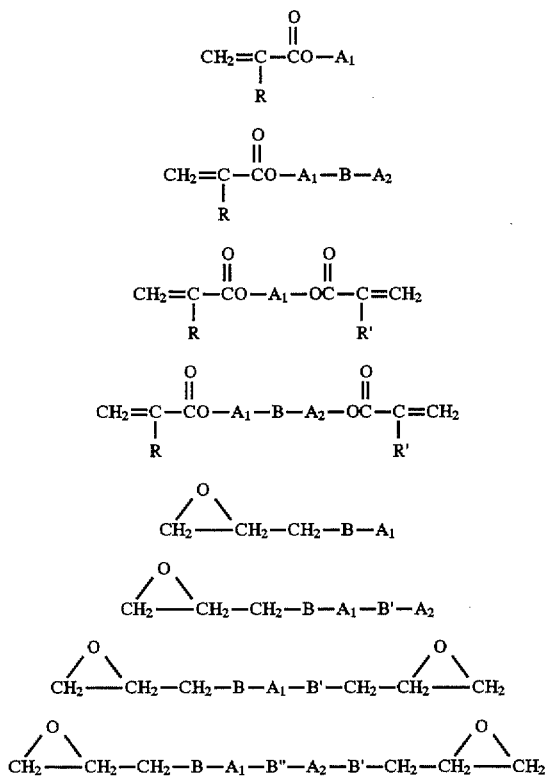

wherein R and R' independently represent H or $CH_3$; B, B' and B" independently represent OCO, COO, OCONH, NHCOO, CONH, NHCO, —C≡C—, an alkyl group, O, N or S; and $A_1$ and $A_2$ independently represent a group containing aromatic ring, such as phenyl, biphenyl, terphenyl, quaterphenyl, naphthalene or anthracene, which may be partially substituted by a halogen, alkyl or cyano group.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 illustrates a display element structure for a panel according to Example 2 of this invention, employing a TFT's as the active element.

FIG. 2 illustrates a display element structure for a panel according to Example 5 of this invention.

FIG. 3 is a graphic illustration and comparison of the electro-optic characteristic of the display elements according to Example 5 and Comparative Example 5.

FIG. 4 is a graphic illustration and comparison of the electro-optic characteristic of the display elements according to Example 6 and Example 7.

FIG. 5 is a graphic illustration and comparison of the electro-optic characteristic of the display elements according to Example 8 and Comparative Example 6.

FIG. 6 illustrates a display element structure for a panel according to Example 12 of this invention, employing a MIM element.

FIG. 7 illustrates a display element structure for a panel according to Example 22, utilizing a color filter and a MIM element.

FIG. 8 is a sectional view of a display element structure for the information processing apparatus according to Example 23.

FIG. 9 is a schematic illustration of a display element structure for the information display apparatus according to Example 24.

FIG. 10 is a schematic illustration of a display element structure for the information display apparatus according to Example 25.

FIG. 11 is a sectional view of a display element structure for the information display apparatus according to Example 26.

FIGS. 12, 13 and 14 each schematically illustrate different configurations of a display element of this invention for the electronic apparatus according to Example 27.

FIGS. 15, 16 and 17 each schematically illustrate different configurations of a vehicle meter display panel according to Example 28.

FIG. 18 is a graphic illustration showing the incidence angle dependency of reflectance for incident light on a flat substrate surface of a display element.

DESCRIPTION OF THE PREFERRED EMBODIMENTS

The invention is now illustrated in more detail by reference to the drawings with respect to the following description.

According to the present invention, in a reverse PDLC display medium, the turbidity of the display in the absence of an applied electric field can be significantly reduced by adding a sufficient amount of dichroic dye to the medium or by employing a liquid crystal or polymer in the medium having a low fluorescence quantum yield. The amount of added dichroic dye varies depending on the intended use and application. In the case where a display element must be transparent in the absence of an applied electric field with an attended reduction on haze, as for example, in the case where a solar battery or other type of display apparatus is positioned on the back surface of the display element, it is preferred that the dichroic dye mixed into the liquid crystal provide for a light absorption in the resulting display element in the range of about 1 to 20%, preferably in the range of about 5 to 10%, whereby the haze becomes less conspicuous without impairing the transparency of the display. On the other hand, in the case where a reflective layer is positioned on the back surface of the display element to absorb the light in the absence of an applied electric field, dichroic dye is mixed with the liquid crystal so that the light absorption quality of the resulting display element becomes not less than 20% providing for good contrast.

On the other hand, the turbidity of a display element in the absence of an applied electrical field can also be reduced by the employment of liquid crystal or polymer material exhibiting a small fluorescence quantum yield. Specific examples of such compounds include liquid crystals and polymer precursors having skeleton which provide a fluorescence quantum yield of approximately 0.3 or less, such as a tolane skeleton or biphenyl skeleton. If the compounds employed exhibiting a fluorescence quantum yield over 0.3, e.g. liquid crystals and polymer precursors having a terphenyl skeleton, are employed, fluorescence emission is observed in the display state in the absence of an applied field, resulting in undesirable display contrast.

In the process of producing a reverse PDLC medium having a low molecular weight, chiral component, the polymer precursor in the liquid crystal is thereafter polymerized to become a polymer so that a proportional amount of the low molecular weight, chiral component contained in the liquid crystal becomes higher and the chiral polymer precursor in the liquid crystal is incorporated into the polymer so that a proportional amount in the liquid crystal is reduced. Therefore, the content ratio of the chiral component in the liquid crystal remains constant even with the occurrence of polymerization and also the chiral pitch remains constant. As a result, the twisted structure of polymer in the initial stage of the polymerization is identical to that in the liquid crystal after the polymerization, and the creation of haze in the transparent state in the absence of an applied field becomes remarkably small.

In the case where the employed chiral component is temperature dependent exhibiting a small change in chiral pitch depending on temperature change, the orientation state of the liquid crystal becomes difficult to change, depending upon the amount of temperature change, after the reverse PDLC medium has already been produced. Therefore, the employment of a chiral component according to this invention renders it possible to prevent the creation of displayed haze caused by operating or environmental temperature changes. It is preferred to employ a chiral component exhibiting a chiral pitch change of 20% or less in the operating or environmental temperature range of the display element.

A reverse PDLC medium is almost transparent in the absence of an applied electric field. Accordingly, in the case where a reverse PDLC medium in the form of display element 21 is placed on the surface of a display apparatus, as in the case of FIG. 10 showing analog mode watch 26 with hour/minute hands, an observer can easily view displayed information in display element 26 beneath the reverse PDLC element 21. When an electric field is applied to the reverse PDLC medium, an observer can concurrently see both the information display beneath the reverse PDLC medium of element 21 and the white display of the reverse PDLC element 21 in the foreground. The foreground display of element 21 is produced by light scattering in the reverse PDLC medium.

In this case, when a reflective layer, especially a transparent layer 29 having a high refractive index, is placed between the back surface of the display apparatus, comprising a back surface analog watch mode 26 with hour/minute hands, and the front surface reverse PDLC display element 21, as illustrated in FIG. 12, incident light on the display apparatus effectively enters into reverse PDLC display element 21 and, as the result, the display appears bright with good contrast. Since the incident light on the front of the display is not reflected too much, analog display 26 positioned at the back surface can be easily seen and visually read. This phenomenon can be understood better with reference to FIG. 18, showing the incidence angle-dependency of reflectance for light incident to a flat substrate surface. As can be seen from FIG. 18, as the angle of incidence increases, so does the amount of reflection from transparent layer 29. However, at incident angles that are substantially normal to the surface being viewed or even at more acute angles of incident, the transparency of layer 29 is substantially good for providing good visibility of clockface 26 via PDLC display element 21 and layer 29. The results in FIG. 18 were determined by calculation according to Fresnel's formula on the assumption that the refractive index of the substrate is 2 and is in contact with air (refractive index=1) wherein natural light was decomposed into two orthogonal polarized light components for purposes of the calculation. Since layer 26 is transparent, the back surface display 26 beneath reverse PDLC display element 21 is never difficult to view. Of course, an equivalent display property with good visible display quality can be realized by means of multiple display elements 21 and 26 superposed on each other in any sequential arrangement, which sequential arrangements are illustrated by the respective arrangements shown in FIGS. 12, 13 and 14.

In the case where the liquid crystal in the reverse PDLC medium also contains dichroic dye, the liquid crystal layer is changed to a light absorbing state through the control of an applied electric field so that the display of information caused by light scattering is provided in a manner illustrated in FIG. 9. In FIG. 9, the reverse PDLC display element 21 is between the front surface analog watch mode 26 with hour/minute hands and the back surface solar battery 22. Of course, the display can be rendered even more clear by the incorporation of a highly refractive layer 29 into the structure as shown in FIG. 8. In place of a reverse PDLC medium, a conventional PDLC medium may be used. In this case, however, in order to make clear a display at the back surface the display apparatus, the liquid crystal layer containing dichroic dye is changed into a transparent state by the control of an applied electric field in a manner opposite to that described for a reverse PDLC medium.

The reverse PDLC medium of the present invention is transparent in the absence of an applied electric field. Accordingly, when a display element having a reverse PDLC medium is placed on the surface of a solar battery, the production efficiency of electric power of the solar battery will less impaired. As previously describe, the solar battery and the display element can be superposed on one other. As the result, not only is a savings in space and miniaturization of the electronic apparatus employing the display element realized, but also the utility of design and application of the electronic apparatus can be more freely achieved.

In the structures of the display elements and the electronic apparatus described above, active elements or a color filters may be formed on either substrate employed with the reverse PDLC medium to increase the display capacity of the display element and to provide a color display. When such a display element is applied to a display for a vehicle navigation system, a motorist can view a road map displayed on the system display without turning his/her head or attention away from the front view of the road so that safe driving conditions can be maintained by the motorist. Of course, these display elements have application to television as well as application with solar batteries to an electronic memorandum book or a laptop computer without running down the battery supply.

In addition, in the structures of the display elements and the electronic apparatus previously described, an anti-reflection treatment or a non-glare treatment may be applied to the surface substrate to improve visibility of the display elements.

EXAMPLE 1

This embodiment is a display element in which dichroic dye is mixed in a trace amount in order to make the haze of a reverse PDLC inconspicuous. In particular, in this embodiment, a liquid crystal composition to be used in Examples 2 to 4 is explained in the followings. That is, a guest-host type liquid crystal was prepared by mixing 99.25 wt % of a TL202 (trade name) BL007 (trade name) mixture (7:3), both being produced by Merck Limited, as a liquid crystal, 0.25 wt % of G470 (a product of Nippon Kanko Shikiso Kenkyusho), 0.4 wt % of SI512 (a product of Mitsui Toatsu Senryo) and 0.1 wt % of M137 (a product of Mitsui Toatsu Senryo) as dichroic dyes. To 98 wt % of the resulting liquid crystal, was added 2 wt % of CNL617 (a product of Asahi Denka Kogyo, K.K.) as a chiral-component and then mixed with each other, to give a chiral guest-host liquid crystal.

In case of a display element is combined with active element, the skeleton of a liquid crystal to be employed should be those having high reliability. As such liquid crystal, chlorine-based biphenyl liquid crystals such as TL202, TL205, TL213, TL215 and TL216 (products of Merck Limited) are preferably used. In addition, there may be used RDP 80616 and RDP 10248 (products of Rodic Inc.) and SS 5004 (a product of Chisso Corporation) as liquid crystal having high reliability, and BL007 (a product of Merck Limited) as highly birefractive liquid crystal. In other uses, liquid crystals having any skeleton may be used so long as they satisfy the driving voltage and birefractive index. Specific examples of liquid crystal compounds to be employed are those containing the following compounds ("$F_n$" indicating that fluorines may be located at any point on any of the benzene nucleus):

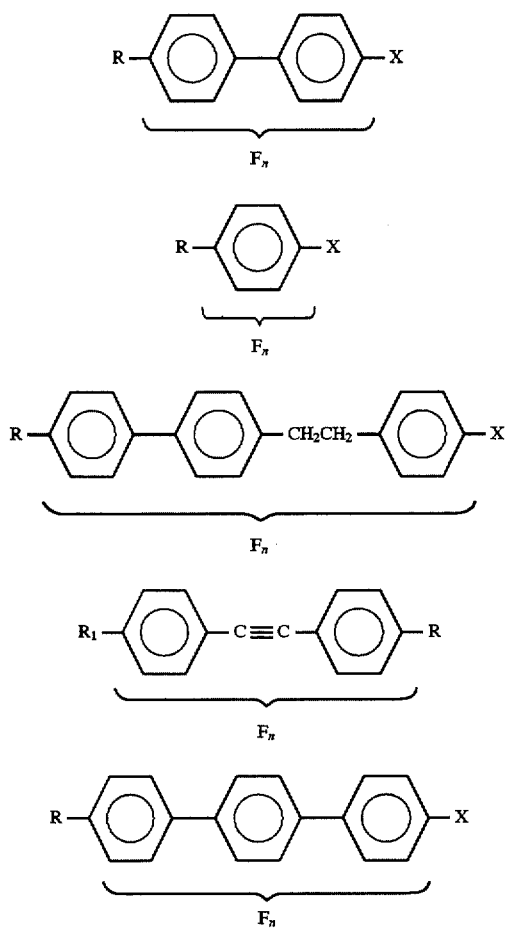

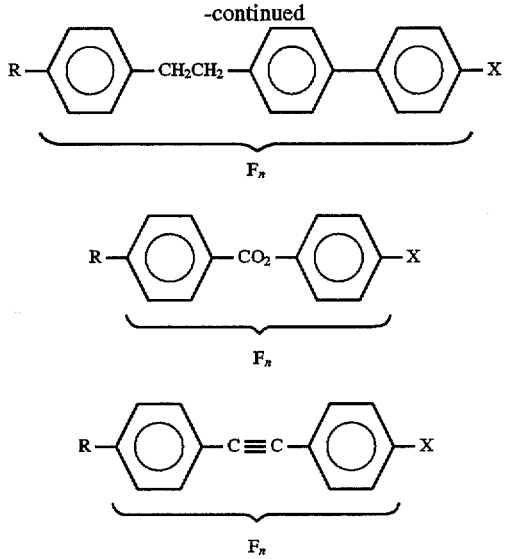

In the above-listed formulae, R represents an alkyl, cycloalkyl, alkoxy or cycloalkoxy group; $R_1$ is an alkyl or alkoxy group, or hydrogen or fluorine; X represents a cyano group, halogen, hydrogen or a vitro group; and n is an integer. In addition, liquid crystals having negative dielectric anisotropy may be used as the liquid crystal. In this process, the alignment treatment to be subjected to the substrate surface is preferably the homeotropic alignment treatment.

As a dichroic dye to be used, any one may be used so long as it exhibits dichroism. However, from viewpoint of light resistance, as shown in this Example, anthraquinone based, naphthoquinone based, and perylene based dichroic dyes are preferred. Furthermore, for the purpose of depressing a haze, dichroic dyes of dark tone and having a low fluorescence quantum yield are more preferable. In the case where a solar battery is used as the background, in order to prevent the lowering of production efficiency of electric power, the amount of dichroic dye to be mixed with liquid crystal is preferably the minimum amount to depress a haze. The degree of haze depends on the kinds of liquid crystals, polymer precursors, chiral components and polymerization conditions to be employed. Therefore, the concentration of the dichroic dye should be adjusted according to the actual circumstances.

As the chiral component to be used, any one may be used so long as it can twist the orientation of the liquid crystal, in an adequate amount. Preferably, the chiral component is those which can twist the orientation of a liquid crystal layer preferably by 90°, and more preferably 270°, in the direction of liquid crystal thickness. Examples of such chiral component include, for example, S811, R811, S1011, R1011, CB15, C15 and CE2 (products of Merck Limited), CM series (a product of Chisso Corporation), and CNL series (a product of Asahi Denka Kogyo, K.K.).

As the polymer precursor to be mixed with the above-described liquid crystals, any one may be used so long as it can be polymerized in the liquid crystal by irradiation of light, electron beam and heat and contains in its molecule a large mesogenic moiety having birefringency. The moiety to be polymerized of the polymer precursor is acrylate, methacrylate, crotonate, cinnamate, epoxy or the like; and the mesogenic moiety is phenyl, biphenyl, terphenyl, quaterphenyl, or the like. In the present invention, a suitable substituted group may be introduced into the polymer precursor for the purpose of improving birefringency and solubility with the liquid crystal. In particular, a polymer precursor in which the moiety to be polymerized and the mesogenic moiety are bonded directly, the resulting polymer tends to become particulate. On the other hand, a polymer precursor in which the moiety to be polymerized and the mesogenic moiety are connected through a spacer, such as an alkyl chain or a polymer precursor having plural of moieties to be polymerized in one molecule, the resulting polymer tends to form a gel-network structure. Examples of the former polymer precursors include the following compounds:

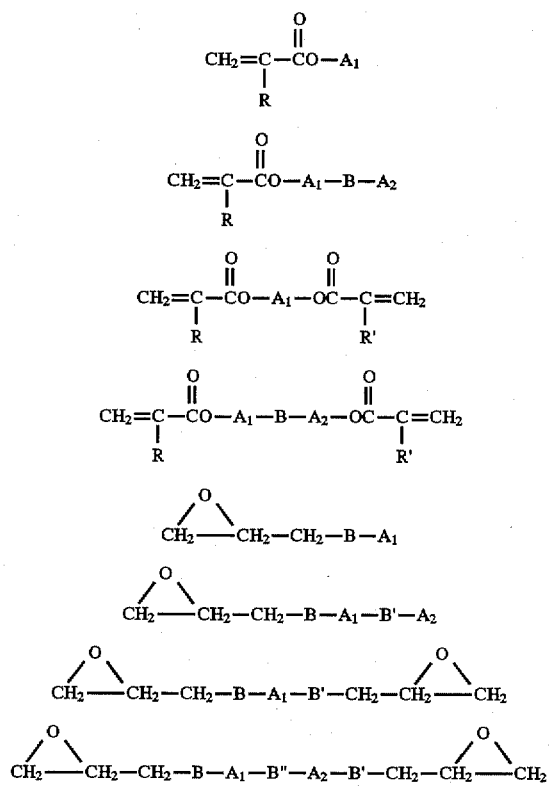

wherein R and R' independently represent H or $CH_3$; B, B' and B" independently represent OCO, COO, OCONH, NHCOO, CONH, NHCO, —C≡C—, an alkyl group, O, N or S; and $A_1$ and $A_2$ independently represent a group containing aromatic ring, such as phenyl, biphenyl, terphenyl, quaterphenyl, naphthalene or anthracene, which may be partially substituted by halogen, alkyl or cyano group.

As the latter polymer precursors, among the monomers listed above, those which are di-functional and those which contain a spacer such as alkyl group between the moiety to be polymerized and the mesogenic moiety may be employed. Examples of commercially available polymer precursors include, for example, Aronix™ and Resedamacromonomer™ produced by Toagosei Chemical Industry Co., Ltd.; KAYARAD™ and KAYAMER™ produced by Nippon Kayaku Company, Ltd.; NOPCOMER™, SICOMET™ and PHOTOMER™ produced by San Nopco Limited; Eptohto, Neotohto and Daptohto produced by Tohto Kasei Co., Ltd.; ADEKA™ RESIN, ADEKA™ OPTOMER and ADEKA™ OPTON produced by Asahi Denka Kogyo, K.K.; 2200 series produced by Threebond Limited; Ripoxy™ and Spirac™ produced by Showa Highpolymer Co., Ltd.; product produced by Nippon Polyurethane Inc., Co., Ltd. These monomers may be mixed in part with the former monomers, i.e., monomers in which the resulting polymers become particulate in nature. In addition, other polymers, such as thermoplastic polymers, e.g. ethyl cellulose, may also be employed.

Comparative Example 1

A liquid crystal composition is prepared according to Example 1, except employing no dichroic dye. Other materials and fabrication conditions were same as Example 1.

EXAMPLE 2

In this embodiment, a polymer particle dispersed type of reverse PDLC medium was made employing the liquid crystal composition of Example 1, and then its haze condition was examined. In particular, a liquid crystal mixture was prepared by using biphenyl methacrylate as the polymer precursor indicated in Example 1 in an amount of 7 wt %, and then placed into a gap provided in a panel as shown in FIG. 1 and then sealed. At first, the fabrication process for the panel is explained with reference to FIG. 1. A transparent electrode is formed on the surface of substrate 1. Next, the surface of electrode 2 was subjected to an alignment treatment. Subsequently, on another substrate 8, TFT elements were formed as an active element comprising gate electrode 15, gate insulation layer 18, semi-conductive layer 16, source electrode 14, drain electrode 17. Aluminum was vapor-deposited to form reflective electrodes 7. The surface of electrodes 7 were subjected to an alignment treatment. Substrates 1 and 8 were spatially supported relative to each other along their peripheries with their electrode surfaces in facing relationship forming a 5 μm gap between their facing surfaces. In this embodiment, the thickness of liquid crystal/ polymer precursor mixed layer 3, inserted into the gap or spacing, was, therefore, set to 5 μm. However, the thickness may be suitably set within the range from 3 μm to 10 μm depending on the intended application. Liquid crystal/ polymer precursor mixed layer 3 was irradiated with UV radiation having a wavelength in the range of 300 nm–400 nm and 3.5 $mW/cm^2$ in its liquid crystal phase, bring about phase separation of polymer particles from the liquid crystal. On the back surface rear surface of the display element, a solar battery was placed as a light-absorbing plate and the surface of the battery was subjected to a non-glare treatment and an anti-reflection treatment. Of course, these treatments are not always required or necessary, and either of these treatments can significantly improve the visibility of the display element.

A 5 V driving voltage was applied to the liquid crystal/ polymer layer, and then light was directed from a inclined direction of 20° based on the normal line of the display element surface, to determined the reflection light intensity to the normal line direction. As the result, the brightness was 30% based on that of a white paper. On the other hand, when the driving voltage was adjusted to 0 V to give a black display state, the reflectance measured was 4%.

In this embodiment, the alignment treatment employed a polyimide aligning film and was carried out in the manner that a polyimide aligning film was formed and then was subjected to a rubbing treatment. However, in the general alignment treatment, other kinds of aligning films may be employed, or only an applied rubbing treatment on the surfaces in contact with the reverse PDLC medium may be used without employing any aligning film, or a LB film or an oblique evaporation film may be employed.

The light absorbing reflective plate to be placed on the back surface of the display element is not necessarily be a solar battery. A light absorbing plate applied with a light reflection treatment on its surface is also preferably used. The plate other than the light-absorbing reflective plates may also be used. For example, reflective plates made of aluminum, chromium and the like may be used. In case of reflective plates having high reflectance, visibility of the resultant can be improved by increasing in the amount of dichroic dye to be added.

In the display element of the present invention, color display becomes possible by forming a color filter on the substrate. In this case, as the colors to be used for the color filter, any one may be employed so long it shows good visibility according to the intended use, as well as the color combination which can reproduce full colors. The color filter to be used is preferably composed of materials exhibiting no absorption in the UV region.

In the present invention, the display element is applied with a non-glare treatment and a anti-reflection treatment on its surface. However, such treatments are not so essential, and the display element without such treatments will exhibit good display properties.

In apparatus having small-to-medium size capacity, such as in the case of a watch, sufficient information can be given even if an active element is not formed thereon.

The active element to be used is not limited to the TFT element here shown, and other TFT elements having other structures, transistors, MIM elements, ferroelectric elements and the like may also be used. As a substrate material to be formed with such active elements on its surface, materials such as glass, silicon, arsenic gallium and germanium, other inorganic substances and organic substances, such as plastics, may be employed. In the display element according to this invention, all the circuit drivers and controller circuitry can be formed directly on the substrates. Therefore, by using the display element, a display apparatus can be fabricated at low cost.

Comparative Example 2

A reverse PDLC was fabricated according to Example 2 using the liquid crystal composition of Comparative Example 1. The resulting reverse PDLC medium was examined its electro-optic characteristics in the same manner as Example 2. As the result, the brightness was 35% based on that of a white paper in the presence of an applied electric field. The reflectance in the absence of an applied electrical field was 8%.

EXAMPLE 3

A polymer gel network aligned type of liquid crystal display element was fabricated using the liquid crystal composition of Example 1.

That is, a display element was fabricated in the same manner as Example 2, using the liquid crystal composition of Example 1, 5 wt % of M6200 (a product of Toagosei Chemical Industry Co., Ltd.) as a polymer precursor and 2 wt % of 184 Irugacure (a product of Ciba Geigy Co.) as a photo-polymerization initiator.

To the liquid crystal/polymer layer of the resulting display element, a 10 V of driving voltage was applied, and then light was entered from the direction inclined by 20° based on the normal line of the display element surface, to determined the reflection light intensity to the normal line direction. As the result, the brightness was 28% based on that of a white paper in the presence of an applied electric field. The reflectance under a black display state in the absence of an applied electrical field was 8% the brightness was 28% based on that of a white paper.

In this embodiment, the polymer precursor to be used may be other compound which can make a gel network effectively, as shown in Example 1. Other conditions were same as those of Example 2.

Comparative Example 3

A display element was fabricated according to Example 3, except using the liquid crystal composition of Comparative Example 1. The resulting display element showed a reflectance under the white display state of 33%, and a reflectance under the black display state of 5%.

EXAMPLE 4

A display element, in which droplets of the liquid crystal were aligned and dispersed in the polymer, was fabricated using the liquid crystal composition, and examined its haze.

In particular, in the liquid crystal/polymer precursor mixture of Example 1, a mixture comprising 30 wt % of M6200 (a product of Toagose Chemical Industry Co., Ltd.) as a polymer precursor and 2 wt % of Irugacure 184™ (a product of Ciba Geigy Co., Ltd) as a photo-polymerization initiator were employed. In this embodiment, other conditions were same as Example 2 to fabricate a display element.

To the liquid crystal/polymer layer of the resulting display element, a 20 V of driving voltage was applied, and then light was entered from the direction inclined by 20° based on the normal line of the display element surface, to determined the reflection light intensity to the normal line direction. As the result, the brightness was 28% based on that of a white paper. The reflectance under a black display state in the absence of an applied electrical field was 10%.

In this embodiment, the polymer precursor to be used may be other compound which can make a gel network effectively, as shown in Example 1. Other conditions were same as those of Example 2.

Comparative Example 4

A display element was fabricated according to Example 4, except using the liquid crystal composition of Comparative Example 1. The resulting display element showed a reflectance under the white display state of 33%, and a reflectance under the black display state of 15%.

EXAMPLE 5

In this embodiment, are fabricated a reverse PDLC in which a tolane-based liquid crystal and a tolane-based polymer was used. FIG. 2 simply illustrates a partial sectional view of the display element according to this embodiment.

At first, a panel in which a liquid crystal/polymer precursor is to be inserted is explained in the followings. A transparent electrode having a desired pattern was formed on a substrate, and then a rubbing treatment was applied to the surface of the resultant. Two substrates thus fabricated were fixed at their peripheries with setting their electrode sides face-to-face and keeping a 4 μm gap therebetween.

Next, the liquid crystal and polymer to be inserted into the panel are explained in the followings. As for the liquid crystal, was used a tolane-based liquid crystal comprising the following compound group I:

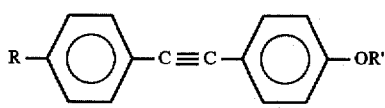

wherein R and R' independently represent an alkyl group having 1 to 12 carbon atoms;

the following compound group II:

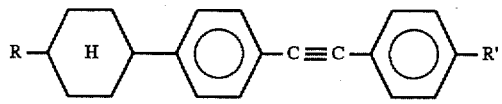

wherein R and R' independently represent an alkyl group having 1 to 12 carbon atoms; and the following compound group III:

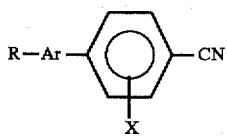

wherein R represents an alkyl group having 1 to 12 carbon atoms; Ar represents phenyl, pyridine and pyrimidine; and X represents F or H, as a mixture in a mixing ratio of 47 wt %: 33 wt %: 20 wt %, respectively. Each compound group to be used in this embodiment was composed of some compounds, and the number of carbon atoms of individual alkyl groups and their mixing ratio are shown in the followings:

Compound group I:
(R=1, R'=11) 2%
(R=3, R'=2) 8%
(R=4, R'=1) 8%
(R=4, R'=2) 9%
(R=4, R'=3) 5%
(R=5, R'=1) 8%
(R=5, R'=3) 5%
(R=5, R'=11) 2%;
Compound group II:
(R=3, R'=2) 21%
(R=4, R'=2) 12%; and
Compound group III:
(R=4) 6%
(R=5) 7%
(R=7) 7%.

In this embodiment, the alkyl groups employed were straight chain type. However, branched type of alkyl groups may also be employed. With 98.5 wt % of the resulting liquid crystal, 1.5 wt % of a chiral component, R1011 (a product of Merck Limited), was mixed. With 95 wt % of this chiral liquid crystal, the following compounds, as polymer precursors, were mixed in the mixing ratio of 3.3 wt % and 1.7 wt %, respectively, to give a liquid crystal/polymer precursor mixture:

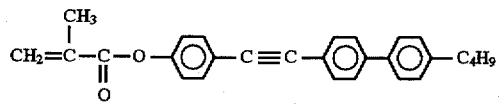

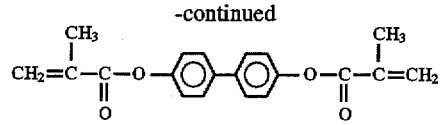

Subsequently, the mixture thus prepared was inserted into the aforementioned panel and sealed under a reduced pressure. Thereafter, UV radiation of 300 nm to 400 nm in wave length and 3.5 mW/cm$^2$ in intensity was irradiated to the resulting panel for 10 minutes to polymerize the polymer precursors.

On the back surface of the display element thus fabricated, a black light-absorbing plate was placed. Light was entered from the direction inclined by 20° based on the normal line of the display element surface to detect the light reflected to the normal direction, whereby a graph showing the electro-optic characteristic shown in FIG. 3 was given. In the graph of FIG. 3, the solid line indicates the electro-optic characteristic of the display element according to this embodiment. As shown in FIG. 3, since the transmittance was extremely high at the threshold voltage or below, the black caused by the light absorbing plate placed on the back surface of the display element and, as the result, the contrast was 27.

The liquid crystal and polymer precursor to be used may be those indicated in Example 1. Among these, those which exhibit a low fluorescence quantum yield in the visible region and a high birefringence are preferable. In particular, those which have tolane or biphenyl skeleton in its molecule are more preferable. on the contrary, undesirable compounds are those which exhibit a high fluorescence quantum yield in the visible region, for example, compounds having anthracene, terphenyl or quaterphenyl skeleton or the compounds in which phenyl groups are connected to one another. On the other hand, in the compound groups I to III shown above, the combination of R and R' of alkyl groups or the mixing ratio of compounds is not limited to those indicated above, and may vary according to experimental and operational conditions such as temperature range of liquid crystal phase, driving voltage. In addition, other compounds may be mixed therewith.

As for chiral component, the kind and the mixing ratio are not limited to those indicated this embodiment, and those indicated in Example 1 may also be employed: they can vary according to the intended use.

The thickness of the liquid crystal/polymer layer is not limited to 4 μm, and may vary within the range of 2 μm to 20 μm, according to the intended use. With the decrease in thickness of the liquid crystal/polymer layer, the transparency in the absence of an applied voltage is increased, whereas the scattering degree is reduced. Oh the other hand, with the increase in the thickness, the scattering degree is increased, whereas the driving voltage required and the cloudiness in the absence of an applied electric field are increased.

The alignment treatment to be applied to the electrode surface may be carried out in such a manner that an aligning film is provided and a rubbing treatment is applied on the film.

The black absorption plate to be placed on the back surface of the display element may be a solar battery or other reflective material.

Comparative Example 5

This is a comparative embodiment to Example 5. In this embodiment, a liquid crystal containing terphenyl skeleton compound was employed comprising a mixture of TL202 (a product of Merck Limited) and 4-cyano-4"-pentyl-terphenyl (T15) in amounts of 80 wt % and 20 wt %, respectively. With 95 wt % of this liquid crystal composition, were mixed 4-terphenylmethacrylate and terphenyl-4,4"-dimethacrylate as polymer precursors in amounts of 3.3 wt % and 1.7 wt %, respectively. Other conditions are same as those in Example 5.

The display element, thus fabricated, was examined for its electro-optic characteristic in the same manner as Example 5. The results are shown in FIG. 3 by the broken line. The display element was transparent at the threshold voltage or below, but fluorescence was observed in the visible region. As the result, the black background appeared whitish and the contrast was reduced by a value of approximately 3.

EXAMPLE 6

The display element fabricated in this embodiment is one in which a tolane-based liquid crystal showing no fluorescence emission in the visible region and a terphenyl-based polymer precursor showing fluorescence emission in the visible region are employed. As the liquid crystal, one indicated in Example 5 was used. As the polymer precursor, terphenyl methacrylate and terphenyl dimethacrylate were used. Other constituent conditions were same as those of Example 5.

The display element thus fabricated was examined its electro-optic characteristic, and the results were shown in FIG. 4 as a solid line. When compared with the results of Example 5, the black display at the threshold voltage or below was somewhat whitish and the contrast was lower, having a contrast value of approximately 12.

EXAMPLE 7

The display element fabricated in this embodiment is one in which a tolane-based polymer showing no fluorescence emission in the visible region and a terphenyl-based liquid crystal showing fluorescence emission in the visible region are used. As the liquid crystal, one indicated in Comparative Example 5 was used. As the polymer precursor, tolane-based one indicated in Example 5 was used. Other constituent conditions were same as those of Example 5.

The display element thus fabricated was examined its electro-optic characteristic, and the results were shown in FIG. 4 as a broken line. The contrast was approximately 6.

EXAMPLE 8

The display element fabricated in this embodiment is one in which a liquid crystal and a polymer precursor showing less fluorescence emission in the visible region are used. As the liquid crystal, was used one indicated in Example 5. A polymer precursor was employed having the following formula:

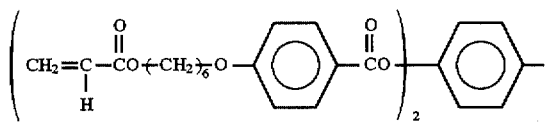

Other conditions were same as those of Example 5. The display element, thus fabricated, was examined for its electro-optic characteristic which is shown by the solid line in FIG. 5.

In this embodiment, any polymer precursor can be used so long as it can form a gel network structure when polymerized. In particular, the polymer precursors capable of making a gel network structure more effectively are those in which two polymerized moieties are contained and the moieties are combined through a long alkyl spacer. The di-functional monomers indicated in Example 1 are especially preferable. Also, the embodiment of this example can be utilized in other embodiments of this invention.

Comparative Example 6

The display element fabricated in this embodiment is fabricated in the same manner as Example 6, except a liquid crystal exhibiting a large fluorescence emission in the visible region was utilized. The liquid crystal employed was E7 (a product of Merck Limited) which contains pentyl terphenyl carbonitrile which exhibits fluorescence emission.

The fabricated display element was examined for its electro-optic characteristic, and the results are shown in FIG. 5 as a broken line. When compared with the display element of this Comparative Example, the display element of Example 8 is found to be of improved contrast.

EXAMPLE 9

The display element of this embodiment is fabricated according to Example 5, in which dichroic dye was mixed with the liquid crystal and the electrodes formed on the substrates were formed with reflective material, i.e., a display element which absorbs light, i.e., the light absorbing mode, in the absence of an applied electric field. The panel was fabricated according to the procedures of Example 2.

After rendering the gap of the panel under a reduced pressure, the liquid crystal/polymer precursor mixture indicated in Example 5 was further mixed with dichroic dyes of M361:SI512:M137 (products of Mitsui Toatsu Senryo) having the mixing ratio 1.5:1.7:0.43 (wt %), and the resulting mixture was inserted into the panel and sealed. The UV radiation of 300 nm to 400 nm in wave length and 3.5 mW/cm$^2$ in intensity was irradiated to this panel at 40° C. for 10 min., whereby the polymer precursor was polymerized and the resulting polymer separated out from the liquid crystal.

A non-glare film which had been subjected to anti-reflection treatment was applied on the surface of the resulting display element and then a light-absorbing layer was placed on the back surface of the display element thereby completing the display panel. When a circuit driver and controller were powered for driving of display element and a computer are connected to the display panel, the computer screen could be viewed. Of course, if this display apparatus is connected to a television tuner, the television screen can be viewed.

The dichroic dye employed in this embodiment is preferably an anthraquinone-based or perylene-based dye exhibiting a good light resistance, and more preferably one that exhibits good dichroism and solubility. The mixing amount of the dichroic dye into the liquid crystal should be considered to ensure optimized contrast.

In this embodiment, a reflective layer to be placed on the back surface of the liquid crystal/polymer layer doubled as an electrode. However, it also be possible to use a transparent electrode and place a reflective layer on the back surface of the display element.

In addition, a substrate on which an active element is formed can be placed either side of the liquid crystal/polymer layer.

A non-glare treatment and an anti-reflection treatment may be applied if necessary.

EXAMPLE 10

The display element of this embodiment employs the liquid crystal and the polymer precursor of Example 8, and further contains dichroic dye and uses the panel of Example 9. The liquid crystal and polymer employed were same as those of Example 8. With 96.7 wt % of the liquid crystal, dichroic dyes M361, SI512 and M34 (products of Mitsui Toatsu Senryo) were mixed in amounts of 1.3:1.6:0.4 (wt %), respectively. Into the panel fabricated in Example 9, the resulting liquid crystal/polymer precursor mixture was inserted and sealed. The UV radiation was irradiated to this panel, to give a display element. A non-glare film which had been subjected to an anti-reflection treatment was applied on the surface of the resulting display element and then a light-absorbing layer was placed on the back surface of the display element: thus a display apparatus, to which the display element of the present invention was applied, was accomplished. When a driver, a controller, an electric power for driving of display element and a computer (any of these being not shown in the drawings) are connected to this display apparatus, the computer screen could be displayed. Of course, if this display apparatus is connected to a television tuner, the television screen can be seen.

EXAMPLE 11

This embodiment is a display element incorporated with the haze reduction technique of the present invention. At first, a liquid crystal is explained. As a liquid crystal, a mixture of RDP80616-2 (a product of Rodic Inc.) and ML1009 (a product of Merck Limited), which both are liquid crystal showing a low fluorescence emission in the visible region, in a mixing ratio of 7:3 was used. With this liquid crystal mixture, 0.25 wt % of G470 (a product of Nippon Kanko Shikiso Kenkyujo), 0.4 wt % of SI512 (a product of Mitsui Toatsu Senryo) and 0.1 wt % of M137 (a product of Mitsui Toatsu Senryo) were mixed as dichroic dyes, to give a guest-host type liquid crystal. With the resulting liquid crystal, 2 wt % of CNL611 (a product of Asahi Denka Kogyo, K.K.) showing a low temperature dependency in chiral pitch was further mixed, whereby a chiral guest-host type liquid crystal was prepared. With this liquid crystal, butylphenyltolane methacrylate and biphenyl dimethacrylate as polymer precursors and the following compound as a chiral polymer precursor were mixed in amounts of 3.3 wt %, 1.7 wt % and 0.3 wt %, respectively.

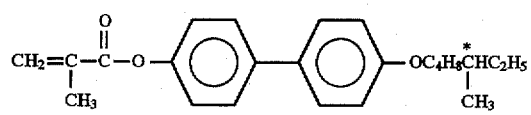

The resultant was inserted into the panel and sealed. The UV radiation was irradiated to this panel at 50° C. The display element thus fabricated may be subjected to a non-glare treatment or an anti-reflection treatment on its surface.

On back surface of the resulting display element, a solar battery was placed, to give a reflection type of display element. This display element was determined for reflectance in the absence of an applied electric field in the same manner as Example 2. As the result, the reflectance at 20° C. was 1%. This display element could be used for segment display for watch by application of an electric field. Furthermore, this display element could employ a solar battery placed on its back surface as a driving power source for liquid crystal.

In this embodiment, an active element was not used. However, if used, same effect might be given. In such case, the liquid crystal having a good retention characteristic should be used, as shown in Example 1. If incorporating with a color filter, a bright color display can be provided. In the case where no active element is used, any material may be employed as a liquid crystal so long as it shows a nematic type liquid crystal phase.

The thickness of the liquid crystal/polymer layer is preferably 3 to 10 µm. Too thin layer leads a low scattering property, whereas too thick layer not only makes the required driving voltage higher but also make decrease in contrast; which are practically disadvantageous.

In stead of the solar battery, a light absorbing layer and/or a light reflective layer may be placed on the back surface of the display element. If without placing anything on the back surface, this display element can also display as white scattering on a transparent glass.

In this embodiment, other materials and fabrication conditions were same as those of Example 12. The chiral components shown in Example 15 may also be used in this embodiment.

EXAMPLE 12

The display apparatus of this embodiment is one combining a display element in which polymer is dispersed as particles or particles-connected aggregations into a liquid crystal containing dichroic dye with an active element, to which a chiral polymer precursor is further applied. FIG. 6 is a simple sectional view of a panel for the display apparatus of the present invention n which a panel was fabricated. At first, a panel was fabricated. A transparent electrode 2 was formed on a substrate 1, and then subjected to a alignment treatment. As the alignment treatment, a conventional method utilized for a TN-type liquid crystal display element. In this embodiment, a polyimide film was formed on the electrode and the treated surface was subjected to a rubbing process. Subsequently, on the opposite substrate 8, 480×640 pieces of MIM element as active element and a reflection electrode 7 were formed, by which the alignment treatment was applied. A layer for protecting the active element may be applied on the resultant. Thereafter, these substrates were fixed at their peripheries to each other as remaining the sealing inlet with keeping a 5 µm gap therebetween. Next, the liquid crystal/polymer precursor mixture is explained. As the liquid crystal, a mixture of TL213 and MJ91261 (products from Merck Limited) in a mixing ratio of 8:2. With 97 wt % of this mixture, 3 wt % of S811 (a product from Merck Limited) as a chiral component was mixed to give a chiral liquid crystal. With 96.3 wt % of the resulting liquid crystal, M361, SI512 and M34 (products of Mist Toatsu Senryo) as dichroic dyes were further mixed in amounts of 1.5 wt %, 1.7 wt % and 0.5 wt %, respectively. To 93 wt % of thus resulting guest-host type chiral liquid crystal, were dissolved biphenyl methacrylate as a polymer precursor and the following compound as a chiral polymer precursor in amounts of 6.86 wt % and 0.14 wt %, respectively:

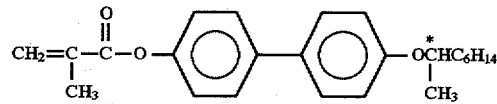

The resultant was inserted into the panel fabricated above. This panel was irradiated with UV radiation (300 nm to 400 nm of wave length; 3.5 mW/cm² in intensity) from the substrate 1 side at 50° C. to polymerize the polymer precursor in the liquid crystal; thus a display element was fabricated. This display element was subjected to an anti-reflection treatment on its surface. This treatment is not always necessary.

The reflectance of this display element determined in the absence of an applied electric field was 3% at 20° C. When a driver for driving of liquid crystal and a controller circuit were connected to the display element, the computer screen could be displayed brightly and with good contrast. Of course, the display element can also be used for terminals for a television or a game machine. If a color filter is incorporated to display element, a bright color display can be given.

As the chiral component, liquid crystal and polymer precursor to be used in this embodiment, those described in Examples 1 and 15 can be used.

As for the content of the dichroic dye, in the case where the display element is used mainly for the transmission in the absence of an applied electric field, for example, in the case whereas solar battery is used as a reflective plate or other display apparatus is further placed, the content of the dichroic dye is cut down to improve the electric power production efficiency of the solar battery or to improve the visibility of the display apparatus. For other uses, as described in this embodiment, light absorption in the absence of an applied electric field is fully done so that the effective contrast can be provided.

Other chiral polymer precursors may be employed such as the following compounds:

the chiral pitch of the liquid crystal part becomes identical to that of the polymer precursor part. For example, a low molecular weight chiral component S811, a product of Merck Co., shows a chiral pitch of approximately 10 μm when it is mixed with a liquid crystal in an amount of 1 wt % based on the amount of the liquid crystal. On the other hand, the chiral polymer precursor used in this embodiment shows a chiral pitch of approximately 20 μm when it is mixed with a liquid crystal in an amount of 1 wt % based on the amount of the liquid crystal. Accordingly, in order to adjust the both chiral pitches identical, 3 wt % of the low molecular weight chiral component S811, a product of Merck Co., is mixed a liquid crystal to adjust its chiral pitch to approximately 3 μm, and 6 wt % of the chiral polymer precursor is mixed with a polymer precursor to adjust the chiral pitch of the polymer precursor to 3 μm. That is, in the stage before polymerization, the polymer precursor is dissolved in a liquid crystal, and the amount of the liquid crystal is the sum of the amount of the low molecular weight liquid crystal and that of the polymer precursor. Therefore, the amount of chiral component to cause to twist them is the sum of the amounts of the low molecular weight chiral component and the chiral polymer precursor. In the polymerization step by a polymerization means, the polymer precursor and the chiral polymer precursor are polymerized

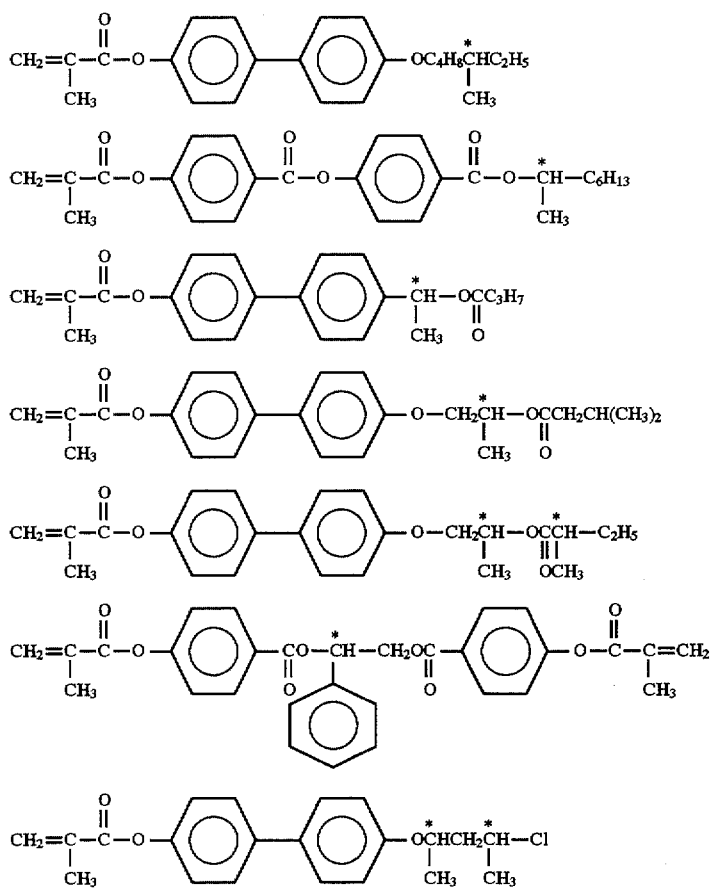

The derivatives of these compounds can also be used, for example, those in which phenyl or biphenyl in the compounds listed above is changed into phenyl, biphenyl or terphenyl skeleton, and those in which the structure of alkyl groups in these compounds are modified. The amount of the chiral polymer precursor to be mixed is determined so that to phase-separate out from the liquid crystal layer and removed. As the result, the chiral component remained in the liquid crystal is only the low molecular weight chiral component. Accordingly, the chiral pitch in the liquid crystal does not change.

On the contrary, in the conventional techniques, compared with this technique, since no chiral polymer precursor is used, a polymer precursor dissolved in a liquid crystal, and the amount of the liquid crystal is the sum of the amounts of a low molecular weight liquid crystal and the polymer precursor. Accordingly, the amount of chiral component to cause to twist them is only that of the low molecular weight chiral component. In the polymerization step by a polymerization means, the polymer precursor is polymerized to phase-separate out from the liquid crystal layer and to be removed. In spite of reducing the amount of the liquid crystal by the amount of the polymerization precursor, the amount of the low molecular weight component remaining therein is not change. As the result, the chiral pitch in the liquid crystal become short and the mismatch between the polymer and the liquid crystal comes to occur.

The thickness of the liquid crystal/polymer layer is preferably 3 to 10 μm. Too thin layer leads a low scattering property, whereas too thick layer not only makes the required driving voltage higher but also leads a decrease in contrast; which are practically disadvantageous.

The active element to be used in this embodiment is not limited to the MIM element indicated in this embodiment, and those which have a transistor structure, such as poly-silicon TFT elements and amorphous silicon TFT elements, those which have a MIM structure, ferroelectric elements may be used. The number of the active elements to be used is not also limited to the number indicated in this embodiment, and it may determined according to the intended use. Of course, if without active element, the display element of this embodiment can display as a watch and an electronic memorandum book, as shown in below.

In this embodiment, the reflective electrode 7 may be a transparent electrode, and a reflective layer may be placed on the back surface of the display element. The reflective layer may include also a light scattering property. Of course, the reflective layer may be a solar battery itself.

Comparative Example 7

The display element of this embodiment employs only S811, a product of Merck Co. as a chiral component in Example 12. Concretely, with the guest-host type chiral liquid crystal of Example 1, 7 wt % of biphenyl methacrylate was mixed as a polymer precursor, to fabricate a display element in the same manner as Example 12.

The reflectance of the thus fabricated display element determined in the absence of an applied electric field was 5% at 20° C.

EXAMPLE 13

The display element of the present invention is one in which a polymer is dispersed as particles or particles-connecting aggregations in a liquid crystal with no dichroic dye, to which a chiral polymer precursor is further used. A panel was fabricated according to Example 5. The mixture of a liquid crystal and a polymer precursor to be inserted into the panel and sealed is explained as follows. A chiral liquid crystal was prepared by mixing 98 wt % of RDP80616-2 (a product of Rodic Inc.) as a liquid crystal and 2 wt % of CNL611 (a product of Asahi Denka Kogyo, K.K.) as a chiral component to each other. With resulting chiral liquid crystal, were mixed buthylphenyltolane methacrylate and biphenyl dimethacrylate as polymer precursors and the compound of Example 11 as a chiral polymer precursor in amounts of 3.3 wt %, 1.7 wt % and 0.3 wt %, respectively. This mixture was inserted into the panel and sealed. Then, UV radiation was irradiated to the resulting panel at 50° C. The display element thus fabricated may be subjected to a non-glare treatment or an anti-reflection treatment on its surface.

On the back surface of this display element, was placed a solar battery. The resulting reflection-type display element was determined for its reflectance in the absence of an applied electric field in the same manner as Example 2. As the result, the reflectance at 20° C. was 1.8%. This display element could be used for segment display of a watch by applying an electric field. Furthermore, in this display element, the solar battery placed on its back surface could be used as a liquid crystal-driving power source.

In this embodiment, no active element was used. However, if used, same effect might be given. In such case, the liquid crystal having a good retention characteristic should be used, as shown in Example 1. If incorporating with a color filter, a bright color display can be provided. In the case where no active element is used, any material may be employed as a liquid crystal so long as it shows a nematic type liquid crystal phase.

The thickness of the liquid crystal/polymer layer is preferably 3 μm to 10 μm. Too thin layer leads a low scattering property, whereas too thick layer not only makes the required driving voltage higher but also make decrease in contrast; which are practically disadvantageous.

In stead of the solar battery, a light absorbing layer and/or a light reflective layer may be placed on the back surface of the display element. This display element can also display without placing anything on its back surface, as white scattering on a transparent glass.

In this embodiment, other materials and fabrication conditions were same as those of Example 12. The chiral components shown in Example 15 may also be used in this embodiment.

Comparative Example 8

The display element of this embodiment is fabricated according to Example 13, except employing only a low molecular weight chiral component as chiral component. That is, with the chiral liquid crystal of Example 13, butylphenyltolane methacrylate and biphenyl dimethacrylate were mixed as polymer precursors in amounts of 3.4 wt % and 1.6 wt %, respectively. Other materials and fabrication conditions employed were the same as those of Example 13.

The display element thus fabricated was determined for its reflectance in the absence of an applied electric field. As the result, the reflectance was 3% at 20° C.

EXAMPLE 14

This embodiment is a display apparatus combining a display element in which a liquid crystal containing dichroic dye is dispersed in a polymer gel network polymer with active element, to which a chiral polymer precursor is incorporated. A panel with TFT element was fabricated according to Example 9. The liquid crystal/polymer precursor mixture to be inserted into the panel and sealed is explained as follows. A mixture of TL205 and BL007 (products of Merck Limited) in a mixing ratio of 7:3 was used as a liquid crystal. A chiral liquid crystal was prepared by mixing 98 wt % of the liquid crystal mixture with 2 wt % of CNL611 (a product of Asahi Denka Kogyo, K.K.) as a chiral component to each other. With 96.3 wt % of the resulting chiral liquid crystal, were mixed M361, M370 and M483 (products of Mitsui Toatsu Senryo) as dichroic dyes in amounts of 1.2 wt %, 2 wt % and 0.5 wt %, respectively, to give a guest-host type chiral liquid crystal. With 97 wt % of this guest-host type chiral liquid crystal, were mixed 3 wt % of a polymer precursor of Example 8 and 0.1 wt % of the following compound as a chiral polymer precursor.

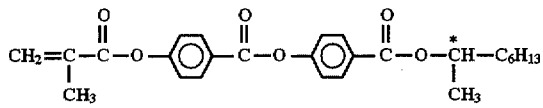

The resulting mixture was inserted into the panel and sealed. The UV radiation (300 nm to 400 nm, 3.5 mW/cm²) was irradiated to this panel from the substrate 1 side at 50° C., to polymerize the polymer precursor in the liquid crystal: thus a display apparatus of this embodiment was accomplished. This display apparatus was subjected to a non-glare treatment and an anti-reflection treatment on its surface. These treatments is not always necessary.

This display apparatus was determined for its reflectance in the absence of an applied electric field in the same manner as Example 1. As the result, the reflectance was 3% at 20° C. When a driver for liquid crystal driving and a controller circuit were connected to the display apparatus, the computer screen could be displayed brightly and with good contrast. Of course, the display apparatus can also be used for terminals for a television or a game machine. If a color filter is incorporated to display element, a bright color display can be given.

As the chiral component, liquid crystal, polymer precursor, active element and other fabrication conditions to be employed in this embodiment, those described in Example 12 can be employed. In particular, the chiral component may be those indicated in Example 15.

As for the content of the dichroic dye, in the case where the display element is used for mainly giving a the transmission in the absence of an applied electric field, for example, in the case where a solar battery is used as a reflective plate or other display apparatus is further placed, the content of the dichroic dye is cut down to improve the electric power production efficiency of the solar battery or to improve the visibility of the display apparatus. For other uses, as described in this embodiment, light absorption in the absence of an applied electric field is fully done so that the effective contrast can be provided.

The thickness of the liquid crystal/polymer layer is preferably 3 μm to 10 μm. Too thin layer leads a low scattering property, whereas too thick layer not only makes the required driving voltage higher but also leads a decrease in contrast; which are practically disadvantageous.

Comparative Example 9

This embodiment is a display element fabricated according to the process of Example 14, except using only a low molecular weight chiral component as the chiral component. That is, With the guest-host type chiral liquid crystal indicated in Example 14, 3 wt % of a polymer precursor employed in Example 8. Other materials and fabrication conditions employed were same as those of Example 14.

The display element thus fabricated was determined for its reflectance in the absence of an applied electric field. As the result, the reflectance was 4% at 20° C.

EXAMPLE 15

This embodiment is a display element in which a liquid crystal containing no dichroic dye is dispersed in a polymer gel network polymer with active element, to which a chiral polymer precursor is incorporated. At first, a panel into which a liquid crystal/polymer precursor mixture was to be inserted and sealed was fabricated according to Example 5. The liquid crystal/polymer precursor mixture to be inserted into the panel and sealed is explained as follows. BL007 (a product of Merck Japan Limited) as a liquid crystal was mixed with 10 wt % of CM22 (a product of Chisso Corporation) and 2.5 wt % of CB15 (a product of Merck Japan Limited) as chiral components, to give a chiral liquid crystal. With this chiral liquid crystal, were mixed 3 wt % of a polymer precursor employed in Example 8 and 0.1 wt % of the following compound as a chiral polymer precursor.

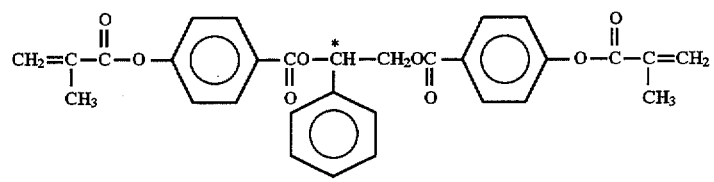

The resulting mixture was inserted into the panel and sealed. The UV radiation was irradiated on the resulting panel at temperature of 50° C. bring about polymerization.

This display apparatus may be subjected to a non-glare treatment or an anti-reflection treatment on its surface.

The resulting display apparatus was determined for its reflectance in the absence of an applied electric field in the same manner as Example 1. As the result, the reflectance was 1.5% at 20° C.

The chiral components used in this embodiment have the following characteristics: both of CM22 and CB15 have an ability to cause the axial rotation of a liquid crystal to the right; and CB15 tends to show a longer chiral pitch with increasing temperature, i.e. exhibiting a positive temperature dependency, whereas CM22 tends to show a shorter chiral pitch with increasing temperature, i.e. showing a negative temperature dependency. Accordingly, like this embodiment, it is preferable to add two or more kinds of chiral components having opposite temperature dependency in chiral pitch relative to each other. Examples of other chiral components having a negative temperature dependency in chiral pitch include CM22 (a product of Chisso Corporation) and the following compounds:

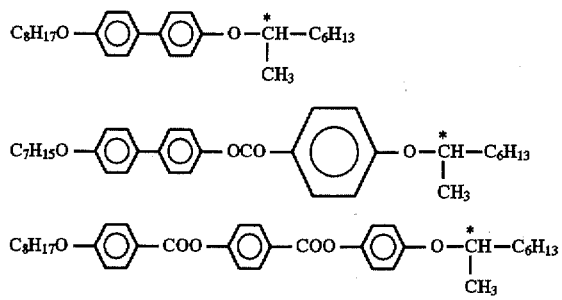

FL519, CNL621, CNL617, CNL616, CNL623, CNL637, CNL638 and CNL639 (products of Asahi Denka Kogyo, K.K.). Examples of other chiral components having a positive temperature dependency in chiral pitch include CM19 and CM20 (products of Chisso Corporation), CB15, C15, S811, S1001, R1011, S1082 and R1082 (products of Merck Limited). Other than these chiral components may also be used. In this embodiment, two kinds of chiral components were used. However, three or more kinds of chiral components may be used in a mixture. Of course, the chiral components having a very small temperature dependency in chiral pitch may also be used, as shown in Example 1.

The liquid crystal, polymer precursor, a panel and other materials and fabrication conditions to be employed in this embodiment were according to Example 13. The composition of chiral components indicated in this embodiment can applied to the display elements in which polymer disperses as particles or particles-connecting aggregations.

Comparative Example 10

This embodiment is a display element fabricated according to the process of Example 15, except using only a low molecular weight chiral component as the chiral component. With the chiral liquid crystal indicated in Example 14, 3 wt % of a polymer precursor employed in Example 8. Other materials and fabrication conditions employed were same as those of Example 15.

The display element thus fabricated was determined for its reflectance in the absence of an applied electric field. As the result, the reflectance was 3% at 20° C.

EXAMPLE 16

This embodiment is a display element in which a liquid crystal containing dichroic dye is dispersed in a polymer matrix, wherein a chiral polymer precursor and active element are incorporated. A panel into which a liquid crystal/polymer mixture was to be inserted was fabricated in the same manner as Example 12. The liquid crystal/polymer precursor mixture to be inserted into the panel is explained as follows. A mixture of TL213 and MJ91261 (products of Merck Limited) in a mixing ratio of 8:2 was used as a liquid crystal. A chiral liquid crystal was prepared by mixing 98 wt % of the liquid crystal mixture with 2 wt % of CNL617 (a product of Asahi Denka Kogyo, K.K.) as a chiral component with each other. With 96.4 wt % of the resulting chiral liquid crystal, were mixed M361, SI512 and M34 (products of Mitsui Toatsu Senryo) as dichroic dyes in amounts of 1.5 wt %, 1.7 wt % and 0.4 wt %, respectively, to give a guest-host type chiral liquid crystal. With 77.6 wt % of this guest-host type chiral liquid crystal, were mixed 20 wt % of M6200 (a product of Toagosei Chemical Industry Co., Ltd.) as a polymer precursor, 0.4 wt % of the following compound as a chiral polymer precursor and 2 wt % of Irugacure 184 (a product of Ciba Geigy Limited) as a photo-polymerization initiator.

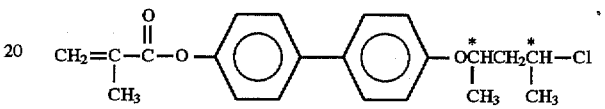

The resulting mixture was inserted into the panel and sealed. The UV radiation (300 nm to 400 nm, 3.5 mW/cm$^2$) was irradiated to this panel from the substrate 1 side at 50° C., to polymerize the polymer precursor in the liquid crystal forming a display apparatus comprising this embodiment. This display apparatus was subjected to a non-glare treatment and an anti-reflection treatment on its surface. These treatments, however, are not always necessary.

This display apparatus was determined for its reflectance in the absence of an applied electric field in the same manner as Example 13. As the result, the reflectance was 8% at 20° C. When a driver for liquid crystal driving and a controller circuit were connected to the display apparatus, the computer screen could be displayed with good contrast. Of course, the display apparatus can also be used for terminals for televisions or game machines. If a color filter is incorporated to display element, a bright color display can be given.

As the chiral component to be used in this embodiment, singular or multiple system as shown in Examples 12 and 15.

As the liquid crystal, polymer precursor, dichroic dye, active element and other materials and fabrication conditions to be employed in this embodiment, those described in Examples 1 and 12 can be employed.

As for the content of the dichroic dye, in the case where the display element is used for mainly giving a the transmission in the absence of an applied electric field, for example, in the case where a solar battery is used as a reflective plate or other display apparatus is further placed, the content of the dichroic dye is cut down to improve the electric power production efficiency of the solar battery or to improve the visibility of the display apparatus. For other uses, as described in this embodiment, light absorption in the absence of an applied electric field is fully done so that the effective contrast can be provided.

The thickness of the liquid crystal/polymer layer is preferably 3 μm to 10 μm. Too thin layer leads a low scattering property, whereas too thick layer not only makes the required driving voltage higher but also leads a decrease in contrast; which are practically disadvantageous.

Comparative Example 11

This embodiment is a display element fabricated according to the process of Example 16, except using only a low molecular weight chiral component as the chiral component. That is, with the chiral liquid crystal indicated in Example 16, only a polymer precursor and a photo-polymerization initiator were mixed and no chiral polymer precursor was mixed. Other materials and fabrication conditions employed were same as those of Example 16.

The display element thus fabricated was determined for its reflectance in the absence of an applied electric field. As the result, the reflectance was 10% at 20° C.

EXAMPLE 17

This embodiment is a display element in which a liquid crystal containing no dichroic dye is dispersed in a polymer matrix, wherein a chiral polymer precursor is incorporated. At first, a panel into which a liquid crystal/polymer mixture was to be inserted was fabricated in the same manner as Example 5. The liquid crystal/polymer precursor mixture to be inserted into the panel is prepared in the following manner. BL007 (a product of Merck Limited) as a liquid crystal was mixed with 3 wt % of R811 (a product of Merck Limited) as a chiral component with each other, to give a chiral liquid crystal. With this chiral liquid crystal, were mixed 30 wt % of M7100 (a product of Toagosei Chemical Industry Co., Ltd.) as a polymer precursor and 1 wt % of the following compound as a chiral component and DETX (a product of Nippon Kayaku Company, Ltd.) as a photo-polymerization initiator.

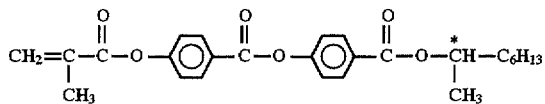

The resulting mixture was inserted into the panel and sealed. The UV radiation was irradiated to this panel at 50° C.: thus a display apparatus of this embodiment was accomplished. This display apparatus may be subjected to a non-glare treatment or an anti-reflection treatment on its surface.

This display apparatus was determined for its reflectance in the absence of an applied electric field in the same manner as Example 1. As the result, the reflectance was 6% at 20° C.

As the chiral component to be used in this embodiment, those indicated in Examples 12 and 15 can be employed.

As the liquid crystal, polymer precursor, a panel and other materials and fabrication conditions to be employed in this embodiment, those described in Example 12 can be employed.

Comparative Example 12

This embodiment is a display element fabricated according to the process of Example 17, except using only a low molecular weight chiral component as the chiral component. That is, with the chiral liquid crystal indicated in Example 17, only a polymer precursor and a photo-polymerization initiator were mixed and no chiral polymer precursor was mixed. Other materials and fabrication conditions employed were same as those of Example 17. The display element thus fabricated was determined for its reflectance in the absence of an applied electric field. As the result, the reflectance was 10% at 20° C.

EXAMPLE 18

This embodiment is a display apparatus combining a display element in which a polymer is dispersed in a liquid crystal containing dichroic dye as particles or particles-connecting aggregates with active element, wherein a chiral component having a small temperature dependency in chiral pitch is incorporated. The same panel as Example 12 was used. The liquid crystal/polymer precursor mixture to be inserted into the panel is explained as follows. A mixture of TL205 and MJ91261 (products of Merck Limited) in a mixing ratio of 8:2 was used as a liquid crystal. A chiral liquid crystal was prepared by mixing 98 wt % of this liquid crystal mixture with 2 wt % of the following compound as a chiral component with each other.

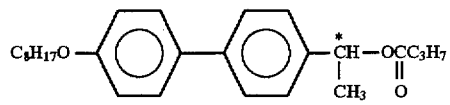

With 96.3 wt % of the resulting chiral liquid crystal, were mixed M361, M370 and M483 (products of Mitsui Toatsu Senryo) as dichroic dyes in amounts of 1.2 wt %, 2 wt % and 0.5 wt %, respectively, to give a guest-host type chiral liquid crystal. To this guest-host type chiral liquid crystal, was dissolved 7 wt % of biphenyl methacrylate as a polymer precursor. The resultant was inserted into the panel and sealed. The UV radiation (300 nm to 400 nm, 3.5 mW/cm$^2$) was irradiated to this panel from the substrate 1 side at 50° C., to polymerize the polymer precursor in the liquid crystal: thus a display apparatus of this embodiment was accomplished. This display apparatus was subjected to a non-glare treatment and an anti-reflection treatment on its surface. These treatments is not always necessary.

This display apparatus was determined for its reflectance in the absence of an applied electric field in the same manner as Example 13. As the result, the reflectance was 2% at 50° C. and 3% at 20° C. When a driver for liquid crystal driving and a controller circuit were connected to the display apparatus, the computer screen could be displayed brightly with good contrast. Of course, the display apparatus can also be used for terminals for televisions or game machines. If a color filter is incorporated to display element, a bright color display can be given.

As the chiral component to be used in this embodiment, any one may be used so long as it has a small temperature dependency in chiral pitch. In particular, the chiral component exhibiting a changing rate in chiral pitch of 20% or less within use temperature range where the display element is used is more preferable. If the changing rate in chiral pitch is over 20%, the display contrast becomes remarkably decreased due to the temperature change during the display element is used. Examples of the chiral component to be used in this embodiment include the following compounds:

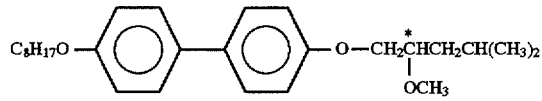

-continued

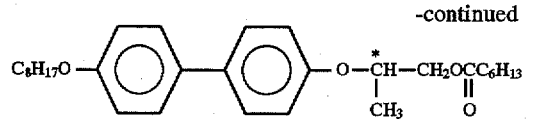
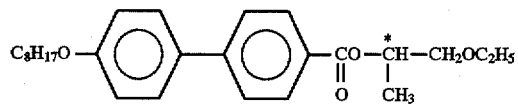
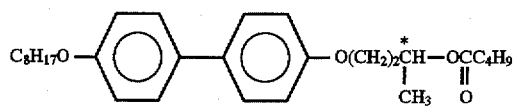
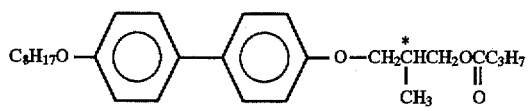
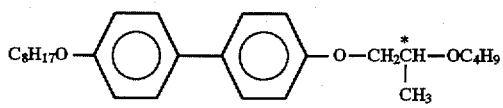
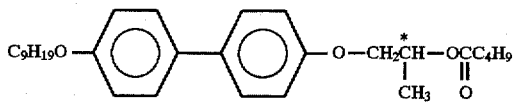
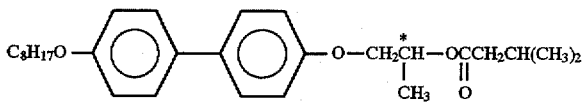
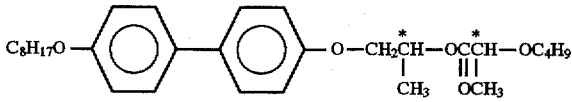
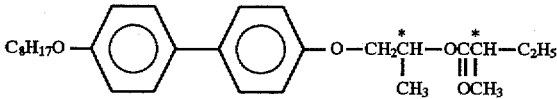
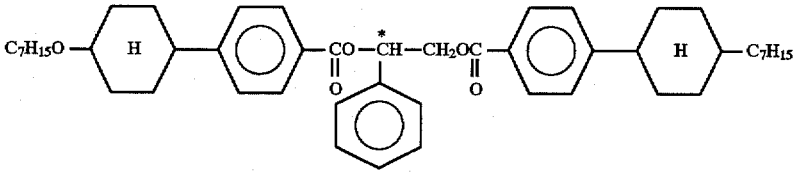
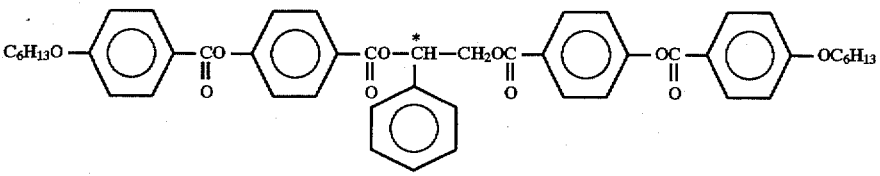

Besides them, CNL611, CNL621, CNL617, CNL616 and CNL623 (products of Asahi Denka Kogyo, K.K.) can also be used. The multiple system of chiral components, as indicated in Example 15, may also be used.

As the liquid crystal and polymer precursor, those indicated in Example 1 can be used.

The thickness of the liquid crystal/polymer layer is preferably 3 μm to 10 μm. Too thin layer leads a low scattering property, whereas too thick layer not only makes the required driving voltage higher but also leads a decrease in contrast; which are practically disadvantageous.

The active element to be used in this embodiment is not limited to the MIM element indicated in this embodiment, and those which have a transistor structure, such as poly-silicon TFT elements and amorphous silicon TFT elements, those which have a MIM structure, ferroelectric elements may be used. The number of the active elements to be used is not also limited to the number indicated in this embodiment, and it may determined according to the intended use. Of course, if without active element, the display element of this embodiment can be operated by a simple matrix type drive or a static drive.

In this embodiment, reflective electrode 7 may be a transparent electrode (with high refractive index), and a reflective layer or a solar battery may be placed on the back surface of the display element. The reflective layer may, in addition, be imparted with a light scattering property.

Comparative Example 13

This embodiment is a display apparatus fabricated according to the process of Example 18, except using only a chiral compound having a positive temperature dependency in chiral pitch as the chiral component. That is, 2.5 wt % of CB15 (a product of Merck Limited) as a chiral component was mixed with the liquid crystal. Other materials and fabrication conditions employed were same as those of Example 18. The display element thus fabricated was determined for its reflectance in the absence of an applied electric field. As the result, the reflectance was 2% at 50° C. and 5% at 20° C.

EXAMPLE 19

This embodiment is a display element which contains no dichroic dye and wherein a liquid crystal and a polymer are dispersed to each other, wherein chiral component having a small temperature dependency in chiral pitch is used. A panel with no active element was fabricated in the same manner as Example 5. The liquid crystal/polymer precursor mixture to be inserted into the panel is explained as follows. A mixture of RDP80616-2 (a produce of Rodic Inc.) and ML1009 (a product of Merck Limited) in a mixing ratio of 7:3 was used as a liquid crystal. A chiral liquid crystal was prepared by mixing this liquid crystal mixture with 2 wt % of CNL617 (a product of Asahi Denka Kogyo, K.K.) as a chiral component with each other. The resulting chiral liquid crystal was mixed with 4 wt % of methyl terphenyl methacrylate as a polymer precursor. The resultant was inserted into the panel and sealed. The UV radiation was irradiated to this panel at 50° C. Thus, a display apparatus of this embodiment was accomplished. This display apparatus may be subjected to a non-glare treatment or an anti-reflection treatment on its surface.

This display apparatus was placed with a solar battery on its back surface to give a reflection-type of display element. The resultant was determined for its reflectance in absence of an applied electric field in the same manner as Example 18. As the result, the reflectance was 1% at 50° C. and 3% at 20° C. When an electric field was applied, the display element could be used for a segment display for a watch.

In this embodiment, no active element was used. However, if used, same effect might be given. In such case, the liquid crystal having a good retention characteristic should be used, as shown in Example 1. It is preferable to use, for example, TL202, TL204, TL205, TL213, TL215, TL216 as a base. If incorporating with a color filter, a bright color display can be provided. In the case where no active element is used, any material may be employed as a liquid crystal so long as it shows a nematic type liquid crystal phase.

The thickness of the liquid crystal/polymer layer is preferably 3 μm to 10 μm. Too thin layer leads a low scattering property, whereas too thick layer not only makes the required driving voltage higher but also make decrease in contrast; which are practically disadvantageous.

In stead of the solar battery, a light absorbing layer and a light reflecting layer may be placed on the back surface of the display element. If without placing anything on the back surface, this display element can also display as white scattering on a transparent glass.

In this embodiment, other materials and fabrication conditions were same as those of Example 18. The chiral components shown in Example 15 may also be used in this embodiment.

Comparative Example 14

This embodiment is a display apparatus fabricated according to the process of Example 19, except using only a chiral compound having a positive temperature dependency in chiral pitch as the chiral component. That is, 5 wt % of CB15 (a product of Merck Limited) was mixed with the liquid crystal. Other materials and fabrication conditions employed were same as those of Example 19.

The display element thus fabricated was determined for its reflectance in the absence of an applied electric field. As the result, the reflectance was 1% at 50° C. and 3% at 20° C.

EXAMPLE 20

This embodiment is a display apparatus combining a display element in which a liquid crystal containing dichroic dye is dispersed in a polymer gel network with active element, wherein a chiral component having a small temperature dependency in chiral pitch is incorporated. A panel with formation of TFT element was fabricated in the same manner as Example 2. The liquid crystal/polymer precursor mixture to be inserted into the panel is explained as follows. A mixture of TL205 and BL007 (products of Merck Limited) in a mixing ratio of 7:3 was used as a liquid crystal. A chiral liquid crystal was prepared by mixing 98 wt % of this liquid crystal mixture with 2 wt % of CNL611 (a product of Asahi Denka Kogyo, K.K.) as a chiral component with each other. With 96.3 wt % of the resulting chiral liquid crystal, were mixed M361, M370 and M483 (products of Mitsui Toatsu Senryo) as dichroic dyes in amounts of 1.2 wt %, 2 wt % and 0.5 wt %, respectively, to give a guest-host type chiral liquid crystal. With 97 wt % of this guest-host type chiral liquid crystal, was mixed 3 wt % of a polymer precursor employed in Example 8. The resultant was inserted into the panel and sealed. The UV radiation (300 nm to 400 nm, 3.5 mW/cm$^2$) was irradiated to this panel from the substrate 1 side at 50° C., to polymerize the polymer precursor in the liquid crystal: thus a display of this embodiment was accomplished. This display apparatus was subjected to a non-glare treatment and an anti-reflection treatment on its surface. These treatments are not always necessary.

This display apparatus was determined for its reflectance in the absence of an applied electric field. As the result, the reflectance was 2% at 50° C. and 3% at 20° C. When a driver for liquid crystal driving and a controller circuit were connected to the display apparatus, the computer screen could be displayed brightly with good contrast. Of course, the display apparatus can also be used for terminals for televisions or game machines. If a color filter is incorporated to display element, a bright color display can be given.

As the chiral component, liquid crystal, polymer precursor, active element and the fabrication conditions, those indicated in Example 2 can be employed. In particular, as for the chiral component, the multiple system indicated in Example 15 may also be used.

The thickness of the liquid crystal/polymer layer is preferably 3 μm to 10 μm. Too thin layer leads a low scattering property, whereas too thick layer not only makes the required driving voltage higher but also leads a decrease in contrast; which are practically disadvantageous.

Comparative Example 15

This embodiment is a display apparatus fabricated according to the process of Example 20, except using only a chiral compound having a positive temperature dependency in chiral pitch as the chiral component. In particular, 2 wt % of CB15 (a product of Merck Limited) as a chiral component was mixed with the liquid crystal. Other materials and fabrication conditions employed were same as those of Example 20.

The display element thus fabricated was determined for its reflectance in the absence of an applied electric field. As the result, the reflectance was 3% at 50° C. and 10% at 20° C.

EXAMPLE 21

This embodiment is a display element in which a liquid crystal containing no dichroic dye is dispersed in a polymer gel network, wherein a chiral component having a small temperature dependency in chiral pitch is incorporated. A panel into which a liquid crystal/polymer precursor mixture was to be inserted was fabricated in the same manner as Example 5. The liquid crystal/polymer precursor mixture to be inserted into the panel is explained as follows. BL007 (a product of Merck Limited) as a liquid crystal was mixed with 10 wt % of CM22 (a product of Chisso Corporation) and 2.5 wt % of CB15 (a product of Merck Limited) as chiral components, to give a chiral liquid crystal. The resulting chiral liquid crystal was mixed with 3 wt % of $C_6H$ used in Example 8 as a polymer precursor. The resultant was inserted into the panel and sealed. The UV radiation was irradiated to this panel at 50° C. The display element thus fabricated may be subjected to a non-glare treatment or an antireflection treatment on its surface.

On the back surface of this display element, a solar battery was placed, to give a reflection type of display element. The resulting display element was determined for its reflectance in the absence of an applied electric field in the same manner as Example 1. As the result, the reflectance was 2% at 50° C. and 5% at 20° C.

As the chiral component to be used in this embodiment, those which were indicated in Example 15 can be employed.

As the liquid crystal, polymer precursor, a panel and other fabrication conditions, those indicated in Example 19 can be employed.

Comparative Example 16

This embodiment is a display apparatus fabricated according to the process of Example 21, except using only a chiral compound having a positive temperature dependency in chiral pitch as the chiral component. That is, 5 wt % of CB15 (a product of Merck Limited) as a chiral component was mixed with the liquid crystal. Other materials and fabrication conditions employed were same as those of Example 21.

The display element thus fabricated was determined for its reflectance in the absence of an applied electric field. As the result, the reflectance was 1% at 50° C. and 3% at 20° C.

EXAMPLE 22

This embodiment is color display apparatus with a color filter, wherein the embodiments described above are applied. FIG. 7 is a simple, partial sectional view of a panel used in this embodiment, in which a color filter is formed. The materials other than a color filter and fabrication conditions were same as those of each embodiment. In this embodiment, dichroic dye was not added. However, for the purpose of improving display contrast, dichroic dye may be added to the color display apparatus. When a liquid crystal driver for color display was connected to this color display apparatus to be used as a computer terminal, color display was provided with good contrast. Of course, the display apparatus can also be used the display of watches, televisions or game machines.

As the construction or composition and the fabrication conditions of the chiral component, liquid crystal/polymer layer, panel to be used in this embodiment, those indicated in Examples 1 to 21. The color display element of this embodiment can also be applied to the electronic apparatus as describe below.

As for the color filter to be used, one having a lighter tone than the conventional transmission-type color filters can give a brighter display. The colors to be displayed in this color display apparatus can be freely select from the colors which can be displayed in a color display, such as three primary colors (i.e. red, blue and green) and yellow, cyan, magenta.

As for the position where a color filter is to be formed, in this embodiment, a color filter was formed on the liquid crystal-contacting side of the substrate 1 positioning in the display side of the display apparatus. However, the color filter may also be formed on the substrate 8. From viewpoint of the required driving voltage, it is preferable to form the color filter between a substrate and an electrode. A transparent electrode may be formed on the color filter.

In the case where the color filter is formed on the substrate 1, the color filter should be made of a material which can transmit UV radiation used for the polymer precursor polymerization.

The active element is not limited to the TFT element indicated in this embodiment, and other TFT elements having other structures, transistors, MIM elements, ferroelectric elements and the like may be used. As the substrate to be formed with such active element thereon, can be employed, for example, semi-conductors such as glass, silicon, arsenic gallium and germanium, other inorganic substances and organic substances such as plastics. In the display element according to the present invention, all of a driving driver and a controller can be built or set into the substrates. Therefore, by using the display element, a display apparatus can be fabricated in extremely low cost.

EXAMPLE 23

This embodiment is electronic memorandum book, which is one kind of information processing apparatus, incorporated with the display elements any of the above described Examples and Comparative Examples as the display. FIG. 8 is a schematic sectional view of the information processing apparatus according to this embodiment. A display element was fabricated according any of foregoing Examples or Comparative Examples, and then placed with a solar battery on their back surface. When the electric power of the solar battery was connected to the power source of the electronic memorandum book, its visibility became improved, and furthermore the amount of time the electronic memorandum book could be used became remarkably increased.

In the electronic apparatus of this embodiment, the solar battery may be connected to a storage battery built in the apparatus to store the electric power produced by the solar battery in the storage battery, by which the electronic apparatus can be operated effectively even in the dark circumstances.

In the conventional electronic memorandum book, since a solar battery occupies a large space, the design and size have been limited. In the electronic memorandum book according to this embodiment, on the contrary, since a display element used is almost transparent, a display panel can be superposed on a solar battery, resulting in realization of an extremely compact electronic memorandum book with no trouble in running down of battery.

This display apparatus may be placed with an information input device such as a tablet or a touch-type panel placed on its back surface.

EXAMPLE 24

This embodiment is illustrated in FIG. 9 showing a watch in schematic form, which is one form of an information display apparatus with which the display element of this invention may be utilized as set forth in any of the previously described Examples and Comparative Examples. Display element 21 is provided with an aperture at its center sealed from the PDLC medium contained with the element. Solar battery 22 was placed on the back surface of display element 21, and the drive shaft for the hands of analog type watch 26 were inserted through the central aperture of display element 21 forming a hybrid type watch. Display element 21 had good display properties with a high degree of visibility resulting for both watch 26 and the digital display at 21.

In the display apparatus of this embodiment, the solar battery may be connected to a storage battery built in the apparatus to store the electric power produced by the solar battery in the storage battery, by which the apparatus can be operated effectively even in the dark circumstances.

This display apparatus could not be driven effectively with the voltage supplied from the solar battery. However, when a booster circuit was incorporated into the apparatus and the voltage of the solar battery was boosted to 5V, the display apparatus showed an extremely bright display.

As one of the driving methods for this display apparatus, the ground of the liquid crystal driver may be shaken in times to the driving timing. This method can make the voltage applied to the display apparatus substantially double the source voltage. As the result, by this method, the display elements described in the above embodiments can be driven effectively and an extremely bright display can be provided.

The display elements of Examples described above are fairly low electric power consumption type. In order to further elongate the battery life of the watch, the watch may be designed so that the display of the display element is provided only in the switch-ON state.

In this embodiment, in stead of the solar battery, a light-absorbing plate may be used, by which the same level of display can be provided. In this case, the driving power source is only a built-in battery.

EXAMPLE 25

This embodiment is watch, which is one kind of information display apparatus, incorporated with the display elements of above described Examples and Comparative Examples. In particular, in this embodiment, shown in FIG. 10, display element 21 is employed as a cover glass for an analog mode watch 26 with solar battery 22 employed at the back surface for the clockface of watch 26 forming a self-power hybrid type of watch. Watch 26 had good display properties with a high degree of visibility resulting for both display element 21 and the watch display at 26.

In this embodiment, a construction other than the one described above was same as in the case of Example 24.

EXAMPLE 26

This embodiment is a portable television as an information display apparatus, to which one of the display elements of above-described Examples and Comparative Examples are applied as shown in FIG. 11. A display element was fabricated according to one of above described Examples or Comparative Examples, and then a solar battery 22 was placed on its back surface. When the resultant was incorporated into a portable television body, a good display with an extremely high visibility could be provided, and furthermore the amount of time the television could be used became remarkably increased.

In this embodiment, the constructions other than described above was same as those of Example 24.

In the conventional portable information display apparatus (i.e. television), since a solar battery occupies a large space, the design and size have been limited. In the information display apparatus according to this embodiment, on the contrary, since a display element used is almost transparent, a display panel can be superposed on a solar battery, resulting in realization of an extremely compact electronic information display apparatus with no trouble in running down of battery.

EXAMPLE 27

This embodiment is a display apparatus in which the display elements of above-described Examples and Comparative Examples are superposed with a display element 21 overlying a highly refractive layer 29 overlying an analog mode watch surface 26 having hour/minutes hands, as schematically illustrated in FIG. 12. This display element could be fully driven with a conventional IC designed for watch. This display element 21 was superposed on a dark clockface at surface 26. In this time, on the surface of the flat dark clockface, ITO (refractive index: 1.8) was vapor-evaporated as a highly refractive layer. When date, time and Clock resistor function were made to display on the two-layer type of display apparatus thus fabricated, a digital display could be provided with large letters on the clockface of the conventional analog-type watch; which was highly functional and fashionable. The brightness of this display apparatus became brighter by 1.5 times that of the apparatus without highly refractive layer.

In this embodiment, the constructions other than described above was same as those of Example 24.

The display apparatus of this embodiment can be used as a display portion of a meter for a machine, a domestic electric product and an electronic apparatus, as well as a wrist watch and a table clock. This display apparatus may be any type, such as an analog mode, a digital mode or a hybrid mode. However, the clockface is preferably dark tone or reflective type, so that the resultant display becomes clearer in contrast and visibility. When a background comprising a solar battery 22 is used as the clockface and the electric power produced by the solar battery is used as the driving power source of the watch or clock, the life of the battery can be remarkably increased.

As the material of the highly refractive layer to be employed, besides ITO, any one may be used so long as it has a high refractive index. Examples of such material include glass materials having a high refractive index, e.g. FDS1, a product of HOYA Corporation with a refractive index of 2, inorganic oxides, thin metal films, films of organic substances and polymers (preferably polymer films containing multiple aromatic rings, such as terphenyl, perylene and tetracene. As to the particular position or location of the highly refractive layer, those positions illustrated in FIGS. 13 and 14 are equally effective.

This embodiment may also be applied to vehicle meter display panels, other mechanized meters, displays of domestic electric products and electronic apparatus. The use of this display apparatus enables the display of both an analog display and a digital display in a small display window. Particularly, the massiveness of analog display is not impaired, and therefore this display apparatus is suitable for the use where high display quality is required. Of course, if applied to a digital display apparatus (such as twisted nematic type liquid crystal element, LED, VFD, plasma display), the display apparatus of this invention can provide the same effect as in the case of more compact or miniaturized applications.

EXAMPLE 28

This embodiment is a vehicle meter display panel employing a display apparatus having the display element of Example 23. As shown in FIG. 15, the liquid crystal layer 31 containing dichroic dye is positioned between display apparatus 30 of the back side and display element 21 of front side. Layer 31 containing dichroic dye is provided between a pair of transparent substrates with electrodes formed on their respective surfaces, which have been subjected to an alignment treatment. The spaced support of the substrates is formed to provided a 7 μm between the substrates. The liquid crystal/polymer layer comprises a liquid crystal mixture of ZLI1840 (a product of Merck Limited), S344 (a product of Mitsui Toatsu Senryo) and CB15 (a product of Merck Limited) in a mixing ratio of 95:3:2. The liquid crystal materials and their mixing ratio are optimized according to the intended use.

If the display of display element 21 of the front side is intended to transparent. The electric field is controlled to render the liquid crystal layer containing dichroic dye to have a light absorbing state so that the displayed information is of high contrast through the light scattering mode. In this case, instead of the reverse PDLC, a conventional PDLC may be used. On the other hand, if display 30 of the display apparatus at the back surface has an applied electric field that is controlled opposite to that of the applied electric field for layer 31 containing dichroic dye, the back surface display will be transparent through the liquid crystal/polymer layer 31.

The liquid crystal layer 31 containing dichroic dye is not limited to the liquid crystal having a positive dielectric anisotropy indicated in this embodiment, as liquid crystal materials having a negative dielectric anisotropy may also be employed. In such a case, it is preferred to apply a homeotropic treatment to the surfaces of the substrates sandwiching the liquid crystal medium, by which, contrary to the case described above, the liquid crystal layer becomes transparent in the absence of an applied electric field and absorbs light in the presence of an applied field.

In FIG. 15, a highly refractive layer 29 can be placed in front of liquid crystal/polymer layer 31. However, as illustrated in FIG. 16, the display is still effective without the use of refractive layer 29.

This embodiment can also be applied to the vehicle meter display panels, other mechanized meters, displays of domestic electric products and electronic apparatus. The use of this display apparatus enables the concurrent, superimposed use of both types of displays of the analog and digital mode in a single display window. In particular, the larger size of analog display is not impaired and, therefore, this display apparatus is readily suitable for the use where high display quality of superimposed images is required. If a panel according to Example 2 or Comparative Example 2 employing a transparent layer 28, instead of refractive layer 29, as shown in FIG. 17, and is superposed on analog meter 30, the resulting display apparatus may be employed as a display for the vehicle navigation system, television receiver or video projector. In this case, a vehicle motorist can easily see the display during driving while still facing the forward in the direction of travel thereby maintaining a safe driving condition.

The display apparatus of this embodiment will provide an equal effect as applied to a digital mode display apparatus, e.g., a twisted nematic type liquid crystal element, LED, VFD, plasma display, or the like.

In summary, this invention comprises the application of PDLC medium or a reverse PDLC medium having a predetermined amount of dichroic dye added to the liquid crystal of the medium with the medium being selected to have a low fluorescence quantum yield wherein a reduced temperature dependency effect relative to a difference in the chiral twist of the liquid crystal layer before polymerization and after polymerization with a significant reduction in haze and a corresponding significant increase in the visibility of the display element incorporating such a medium. The haze reduction technique of this invention is very effective for aesthetic and fashion-conscience applications such as in the case of a watch. For example, in a wrist watch, when a reverse PDLC display element is positioned as a clockface of the watch or as a cover glass for the watch, the haze created by the PDLC display element is almost inconspicuous resulting in high contrast. Thus this display element has application with any type of electronic apparatus either by superposing the reverse PDLC display element directly on a conventional display apparatus or directly on a solar battery or with an interposing highly refractive layer, a bright, multi-functional electronic apparatus with a high visibility can be realized.

The use of a display element or an electronic apparatus employing the display element of this invention enables manufacturer of wrist watches, table clocks, domestic electric products and electronic apparatus with a very large capacity with high image visibility. Furthermore, in the case where a solar battery is built into or integrated with the display element or apparatus, the resulting display element and apparatus are compact having high image visibility and low electric power consumption. For example, due to the employment of the PDLC environment taught by this invention technique, the reverse PDLC medium itself effectively functions as the cover glass of the electronic device or the clockface of an analog mode watch overlying a solar battery. Accordingly, a watch imparted with both the beauty of an analog mode watch and the multi-functionality of a digital mode watch can be provided in a superimposed fashion with clear imagery of the displayed information.

On the other hand, when the PDLC environment taught by this invention technique is employed as the display portion of an electronic memorandum book or a potable television, even in the case where a solar battery is built into the structure, an extremely compact electronic memorandum book or a potable television with high visibility can be provided. Particularly those incorporated with a solar battery can be employed without the problem of running down the battery.

The display element and apparatus of the present invention can also be employed as an meter vehicle panel with good visibility. For example, a reverse PDLC panel is placed on the surface of a conventional analog mode display apparatus employed as a panel in vehicles. Then, the back surface analog display is illuminated by means of a back light and the front display panel is illuminated from the front side so that the front display will stand out visually on the analog display at the back surface creating a combination display having excellent visibility. Since the display element of this invention can be placed on a conventional mechanized meter type display, the range of application of the invention is of wide utility. The display element for electronic apparatus of this invention is basically of the reflective type, and its displayed image visibility improves with ambient brightness. Therefore, the deterioration of visibility brought about with electronic apparatus of the self-emission type and back light type is eliminated. In addition, in the case where a display element employing a conventional back light type or reflective type of twisted nematic liquid crystal medium is positioned on the back surface of a display element utilizing the PDLC medium of this invention, improved visibility of both display elements is achieved relative to their superimposed, generated images.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A display element comprising a pair of substrates supported in spatial relation forming a gap, said substrates having electrodes formed on one of their surfaces, a liquid crystal and polymer medium in said gap comprising a phase separated mixture of a polymer or polymer precursor portion with a liquid crystal portion, and a chiral component for decreasing the reflection of light in absence of an applied field to said electrodes; said chiral component comprising a low molecular weight chiral component and a chiral polymer precursor, said chiral polymer precursor being incorporated into the polymer portion of said liquid crystal and polymer medium and said low molecular weight chiral component being incorporated into the liquid crystal portion of said liquid crystal and polymer medium.

2. The display element of claim 1 wherein a pitch of said chiral component in said medium is substantially the same as the pitch in liquid crystal portion of said liquid crystal-polymer medium.

3. The display element of claim 1 wherein said chiral component exhibits a variation of chiral pitch not exceeding 20% of an operating range of temperature for the display element.

4. The display element of claim 1 wherein said chiral component comprises at least two chiral components exhibiting opposite temperature dependency effects on chiral pitch relative to each other.

5. The display element of claim 1 wherein said liquid crystal and polymer medium includes a compound exhibiting a fluorescence quantum yield in the visible region of not more than 0.3 and is provided in said medium in an amount of not less than 60 wt %.

6. The display element of claim 5 wherein said liquid crystal portion includes said compound, said compound comprising a biphenyl or tolane skeleton in its molecular composition.

7. The display element of claim 6 wherein said compound has a terphenyl skeleton in its molecular composition in the liquid crystal portion in an amount not exceeding about 10%.

8. The display element of claim 5 wherein said polymer portion includes said compound, said compound comprising a biphenyl or tolane skeleton in its molecular composition.

9. The display element of claim 8 wherein said compound has a terphenyl skeleton in its molecular composition in the polymer portion in an amount not exceeding about 10%.

10. The display element of claim 1 wherein the liquid crystal portion includes a dichroic dye.

11. The display element of claim 1 wherein said polymer is in a form selected from the group consisting of independent particles, chain connected particles, coupled particles, and particle aggregates.

12. The display element of claim 1 wherein said polymer is a gel network.

13. The display element of claim 1 wherein said polymer dispersed in the liquid crystal portion in the form of droplets.

14. The display element of claim 1 wherein a non-glare, anti-reflecting surface is provided on one surface of said display element.

15. The display element of claim 1 wherein a color filter is employed on a surface of one of said substrates in contact with liquid crystal and polymer medium.

16. The display element of claim 1 wherein a plurality of active elements are formed on a surface of one of said substrates in contact with said liquid crystal and polymer medium.

17. The display element of claim 1 wherein said liquid crystal portion contains at least one of the following compounds:

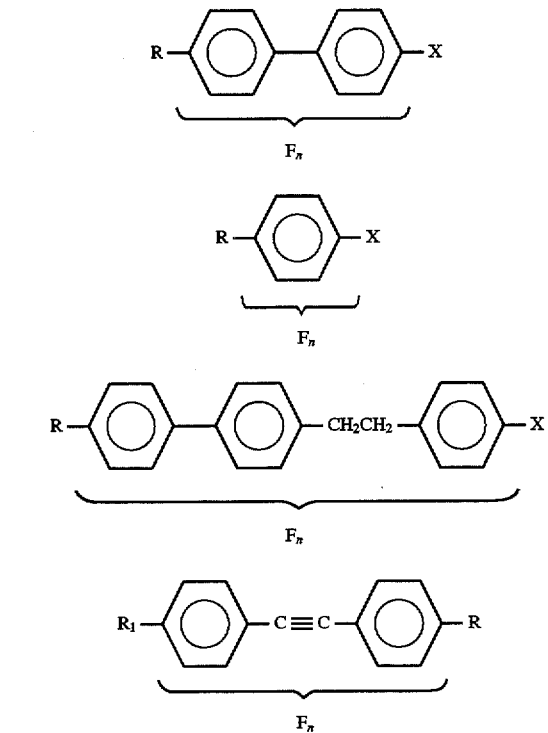

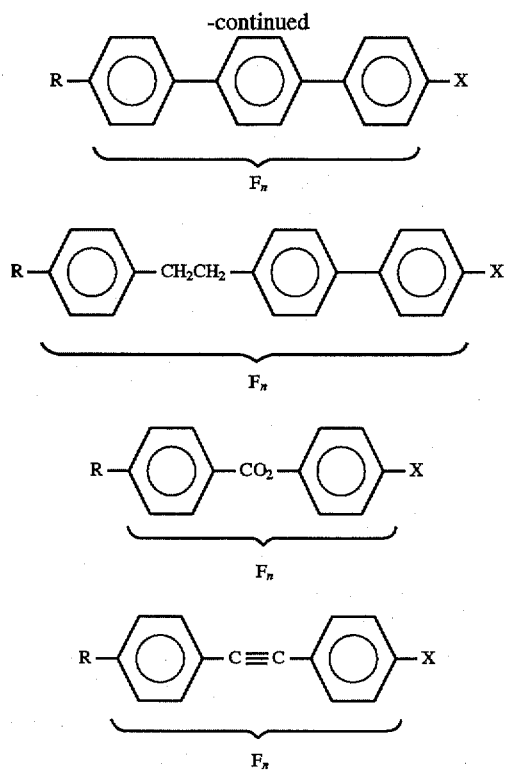

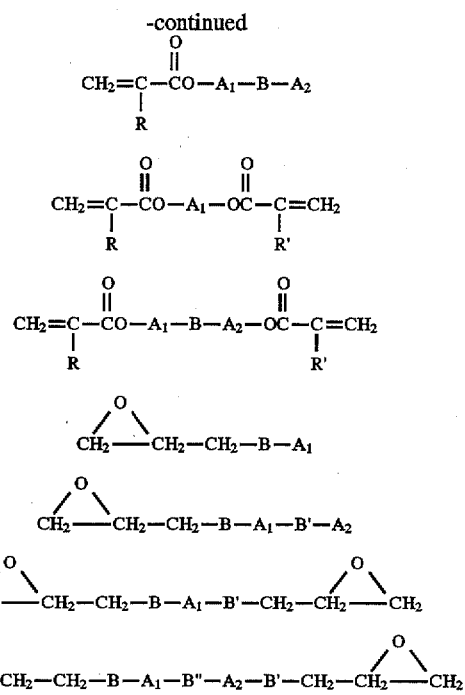

wherein n is an integer; R represents an alkyl, alkoxy, cycloalkyl or cycloalkoxy group; $R_1$ and $R_2$ independently represent an alkyl, cycloalkyl, alkoxy or cycloalkoxy group or H or F; and X represents H, F, Cl or CN.

18. The display element of claim 1 wherein said polymer portion contains at least one of the following compounds:

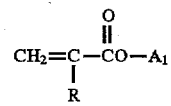

wherein R and R' are respectively either H or $CH_3$; B, B' and B" are respectively any one of OCO, COO, OCONH, NHCOO, CONH, NHCO, —C≡C—, an alkyl group, O, N or S; and $A_1$ and $A_2$ are respectively a group containing an aromatic ring comprising phenyl, biphenyl, terphenyl, quaterphenyl, naphthalene and anthracene with substitution thereof selected from the group consisting of a halogen, alkyl group and cyano group.

19. The display element of claim 1 wherein one of said substrates includes a reflective surface.

20. The display element of claim 16, wherein said active elements are selected from the group consisting of TFT, MIM transistor and farro-electric elements.

* * * * *

UNITED STATES PATENT AND TRADEMARK OFFICE
CERTIFICATE OF CORRECTION

PATENT NO. : 5,686,017

DATED : November 11, 1997

INVENTOR(S) : Hidekazu KOBAYASHI; Eiji CHINO; Masayuki YAZAKI; and Hidehito IISAKA It is certified that error appears in the above-indentified patent and that said Letters Patent is hereby corrected as shown below:

On the front cover, please add:

--[62]  Related U.S. Application Data
    Continuation of PCT/JP94/00505, March 29, 1994--

Signed and Sealed this

Seventeenth Day of March, 1998

*Attest:*

BRUCE LEHMAN

*Attesting Officer*     Commissioner of Patents and Trademarks